United States Patent
Zhu et al.

(10) Patent No.: US 12,399,619 B2
(45) Date of Patent: Aug. 26, 2025

(54) DATA PROCESSING METHOD FOR MEMORY DEVICE, APPARATUS, AND SYSTEM

(71) Applicant: Huawei Technologies Co., Ltd., Shenzhen (CN)

(72) Inventors: Xiaoming Zhu, Shanghai (CN); Yigang Zhou, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/896,884

(22) Filed: Aug. 26, 2022

(65) Prior Publication Data

US 2022/0404973 A1     Dec. 22, 2022

Related U.S. Application Data

(63) Continuation of application No. PCT/CN2021/071134, filed on Jan. 11, 2021.

(30) Foreign Application Priority Data

Feb. 27, 2020  (CN) .......................... 202010124905.5
Jul. 28, 2020  (CN) .......................... 202010740899.6

(51) Int. Cl.
    *G06F 3/06*     (2006.01)
(52) U.S. Cl.
    CPC .......... *G06F 3/0607* (2013.01); *G06F 3/0659* (2013.01); *G06F 3/0679* (2013.01)
(58) Field of Classification Search
    CPC .... G06F 3/0607; G06F 3/0659; G06F 3/0679; G06F 2212/1016; G06F 12/0284;
    (Continued)

(56) References Cited

U.S. PATENT DOCUMENTS 10,223,273 B2   3/2019  Yang et al.
11,314,635 B1 *  4/2022  Volpe .................. G06F 11/1004
(Continued)

FOREIGN PATENT DOCUMENTS

CN    105446899 A    3/2016
CN    105808455 A    7/2016
(Continued)

OTHER PUBLICATIONS

Maliniak, David "DDR Memory Interface Basics" Signal Integrity Journal, Jul. 5, 2017, https://www.signalintegrityjournal.com/articles/print/473-ddr-memory-interface-basics (Year: 2017).*

(Continued)

*Primary Examiner* — Michael Krofcheck
(74) *Attorney, Agent, or Firm* — SLATER MATSIL, LLP

(57) ABSTRACT

This application discloses a data processing method for a memory device, an apparatus, and a system, and relates to the field of data storage technologies, so that memory capacity expansion can be implemented, and the memory capacity expansion is not limited by an original quantity of DDR channels. The memory device includes a controller, a first memory, and a second memory, the controller separately communicates with a processor, the first memory, and the second memory, and read/write performance of the first memory is higher than read/write performance of the second memory. The method includes receiving an operation request of the processor, where the operation request includes a logical address, and accessing the first memory or the second memory based on the logical address.

20 Claims, 15 Drawing Sheets

(58) Field of Classification Search
CPC ....... G06F 2212/205; G06F 2212/7201; G06F 9/5016; G06F 13/1694; G06F 12/0246; G06F 3/0604; G06F 3/0658; G06F 2213/0026
See application file for complete search history.

(56) References Cited

U.S. PATENT DOCUMENTS

| | | | |
|---|---|---|---|
| 2007/0162670 A1* | 7/2007 | Yang | G11C 29/028 710/100 |
| 2010/0110748 A1* | 5/2010 | Best | G11C 14/0018 365/230.01 |
| 2014/0115235 A1* | 4/2014 | Ito | G06F 12/0246 711/103 |
| 2017/0038982 A1* | 2/2017 | Lemberg | G06F 3/0659 |
| 2017/0185327 A1 | 6/2017 | Powell | |
| 2017/0300419 A1* | 10/2017 | Yang | G06F 13/28 |
| 2017/0322876 A1* | 11/2017 | Wright | G06F 11/20 |
| 2018/0088853 A1 | 3/2018 | Kotra et al. | |
| 2018/0260323 A1 | 9/2018 | John et al. | |
| 2020/0341693 A1* | 10/2020 | Rawlins | G06F 3/0686 |
| 2021/0089454 A1* | 3/2021 | Simionescu | G06F 13/161 |
| 2022/0165326 A1* | 5/2022 | Ware | G11C 11/4076 |

FOREIGN PATENT DOCUMENTS

| | | |
|---|---|---|
| CN | 105938458 A | 9/2016 |
| CN | 107885456 A | 4/2018 |
| CN | 109582214 A | 4/2019 |
| CN | 109684238 A | 4/2019 |
| KR | 20190067088 A | 6/2019 |
| WO | 2016121026 A1 | 8/2016 |

OTHER PUBLICATIONS

"Phase Change Memory Market to Reach USD 46.52 Billion By 2026," Reports and Data, Source: Reports and Data, Nov. 13, 2019, 2 pages.

Huang Yaoqin et al., "MFTL: A merge policy based on the non-aligned update data of the SSD system," Jul. 4, 2018, 9 pages (with Translation).

* cited by examiner

DATA PROCESSING METHOD FOR MEMORY DEVICE, APPARATUS, AND SYSTEM

CROSS-REFERENCE TO RELATED APPLICATIONS

This application is a continuation of International Application No. PCT/CN2021/071134, filed on Jan. 11, 2021, which claims priority to Chinese Patent Application No. 202010124905.5, filed on Feb. 27, 2020 and Chinese Patent Application No. 202010740899.6, filed on Jul. 28, 2020. All of the aforementioned applications are hereby incorporated by reference in their entireties.

TECHNICAL FIELD

This application relates to the field of data storage technologies, and in particular, to a data processing method for a memory device, an apparatus, and a system.

BACKGROUND

In a conventional technology, a memory controller is built in a central processing unit (CPU), and the memory controller communicates with a dynamic random access memory (DRAM) through a double data rate (DDR) parallel bus, as shown in FIG. 1. The CPU accesses the DRAM through the DDR parallel bus.

As the craft evolves, a quantity of CPU cores is increasing rapidly. Due to physical limitations of a CPU area and DRAM craft scaling, growth rates of a quantity of memory channels, a capacity, and a bandwidth cannot entirely match the CPU. As a result, overall system performance is severely affected and a memory wall problem is caused. Therefore, it is urgent to resolve the memory wall problem.

FIG. 2 shows a technical solution for resolving a memory wall. Specifically, a memory controller is connected to a storage class memory (SCM) through a DDR parallel bus, to implement memory expansion. However, in the technical solution, a DDR channel is additionally occupied, and consequently, the memory capacity expansion is limited by a quantity of DDR channels. In other words, after the quantity of DDR channels is used up, the memory capacity expansion cannot be performed.

SUMMARY

Embodiments of this application provide a data processing method for a memory device, an apparatus, and a system, so that memory capacity expansion can be implemented, and the memory capacity expansion is not limited by an original quantity of DDR channels.

To achieve the foregoing objectives, this application uses the following technical solutions.

According to a first aspect, a data processing method for a memory device is provided, where the memory device includes a controller, a first memory, and a second memory, the controller separately communicates with a processor, the first memory, and the second memory, and read/write performance of the first memory is higher than read/write performance of the second memory. The method includes: receiving an operation request of the processor, where the operation request includes a logical address; and accessing the first memory or the second memory based on the logical address. The technical solution can be used to implement memory capacity expansion. In addition, in one aspect, memory capacity expansion is not limited by an original quantity of DDR channels. In another aspect, compared with an existing technology, costs of memory capacity expansion are low. In still another aspect, when a data operation request is implemented, an application program does not need to be modified for adaptation, an operating system does not need to be installed with a corresponding driver, and a BIOS configuration is not needed. Therefore, implementation is simple. For a detailed analysis process, refer to the following descriptions.

In a possible design, the operation request is a write operation, and the accessing the first memory or the second memory based on the logical address specifically includes: writing, based on the logical address, to-be-written data into storage space indicated by a first physical address of the first memory, where the first physical address is a physical address that is of the first memory and that is corresponding to the logical address. Because the read/write performance of the first memory is higher than the read/write performance of the second memory, data is written into the first memory preferably, to help improve data write efficiency.

In a possible design, the method further includes: flushing data that is in the first memory and that meets a first condition to the second memory, where the data that meets the first condition includes at least one of the following: data in the first memory when a data amount is greater than or equal to a first threshold; data whose storage time is greater than or equal to a second threshold; or data whose probability of having a read hit is less than or equal to a third threshold. The technical solution may be considered as a process of performing persistence on data. In this way, on the one hand, storage space of the first memory is released, so that the processor can continue to write data into the first memory, to implement the memory capacity expansion. On the other hand, compared with some conventional technologies in which data persistence is performed only when a system is powered off, the technical solution does not need to specifically set a large-capacity battery-protected power supply for data persistence, and therefore helps reduce costs.

In a possible design, the method further includes: writing data that is in the second memory and that meets a second condition into the first memory, where the data that meets the second condition includes at least one of the following: predicted to-be-read data based on read data; data whose probability of having a read hit is greater than or equal to a fourth threshold; or to-be-read data when it is determined, based on a read operation sent by the processor, that the first memory does not have a read hit. In this way, when the second condition is properly set, subsequent data read efficiency is improved.

In a possible design, the method further includes: the operation request is a read operation, and the accessing the first memory or the second memory based on the logical address specifically includes: when the first memory stores to-be-read data, reading the to-be-read data from the first memory based on the logical address; or when the first memory does not store to-be-read data, reading the to-be-read data from the second memory based on the logical address. Because the read/write performance of the first memory is higher than the read/write performance of the second memory, this helps improve a data read rate.

According to a second aspect, a controller is provided, where the controller separately communicates with a processor, a first memory, and a second memory, read/write performance of the first memory is higher than read/write performance of the second memory, and the controller includes a bus interface, a first processor, and a memory controller. The bus interface is configured to receive an operation request sent by the processor, where the operation request includes a logical address; the first processor is configured to send a first instruction to the memory controller based on the logical address; and the memory controller is configured to access the first memory or the second memory based on the first instruction. The first processor may be referred to as a CPU processor, for example, an ARM processor or an X86 processor.

In a possible design, the operation request is a write operation, and the memory controller is specifically configured to write to-be-written data into storage space indicated by a first physical address of the first memory, where the first physical address is a physical address that is of the first memory and that is corresponding to the logical address.

In a possible design, the first processor is further configured to send a second instruction to the memory controller; and the memory controller is further configured to flush, to the second memory based on the second instruction, data that is in the first memory and that meets a first condition, where the data that meets the first condition includes at least one of the following: data in the first memory when a data amount is greater than or equal to a first threshold; data whose storage time is greater than or equal to a second threshold; data whose probability of having a read hit is less than or equal to a third threshold; or to-be-read data when it is determined, based on a read operation sent by the processor, that the first memory does not have a read hit.

In a possible design, the first processor is further configured to send a third instruction to the memory controller; and the memory controller is further configured to write, based on the third instruction, data that is in the second memory and that meets a second condition into the first memory, where the data that meets the second condition includes at least one of the following: predicted to-be-read data based on read data; or data whose probability of having a read hit is greater than or equal to a fourth threshold.

In a possible design, the operation request is a read operation, and the memory controller is specifically configured to: when the first memory stores to-be-read data, read the to-be-read data from the first memory based on the logical address; or when the first memory does not store to-be-read data, read the to-be-read data from the second memory based on the logical address.

In a possible design, the controller is applied to a memory device, and the memory device further includes the first memory and the second memory.

According to a third aspect, a controller is provided, where the controller separately communicates with a processor, a first memory, and a second memory, read/write performance of the first memory is higher than read/write performance of the second memory, and the controller includes: a receiving unit, configured to receive an operation request of the processor, where the operation request includes a logical address; and a processing unit, configured to access the first memory or the second memory based on the logical address.

In a possible design, the operation request is a write operation, and the processing unit is specifically configured to write, based on the logical address, to-be-written data into storage space indicated by a first physical address of the first memory, where the first physical address is a physical address that is of the first memory and that is corresponding to the logical address.

In a possible design, the processing unit is further configured to flush data that is in the first memory and that meets a first condition to the second memory, where the data that meets the first condition includes at least one of the following: data in the first memory when a data amount is greater than or equal to a first threshold; data whose storage time is greater than or equal to a second threshold; or data whose probability of having a read hit is less than or equal to a third threshold.

In a possible design, the processing unit is further configured to write data that is in the second memory and that meets a second condition into the first memory, where the data that meets the second condition includes at least one of the following: predicted to-be-read data based on read data; data whose probability of having a read hit is greater than or equal to a fourth threshold; or to-be-read data when it is determined, based on a read operation sent by the processor, that the first memory does not have a read hit.

In a possible design, the operation request is a read operation, and the processing unit is specifically configured to: when the first memory stores to-be-read data, read the to-be-read data from the first memory based on the logical address; or when the first memory does not store to-be-read data, read the to-be-read data from the second memory based on the logical address.

In a possible design, the controller is applied to a memory device, and the memory device further includes the first memory and the second memory.

Based on any one of the technical solutions provided in the first aspect to the third aspect, the following provides several possible designs:

In a possible design, persistence performance of the first memory is lower than persistence performance of the second memory.

In a possible design, the first memory is a DRAM, and the second memory is an SCM.

In a possible design, the first memory is a DRAM, and the second memory is a NAND flash.

In a possible design, the controller communicates with the processor through a serial bus.

In a possible design, the serial bus includes a PCIe bus.

In a possible design, the memory device is specifically a memory module. Alternatively, the memory device includes a main board and a memory module, the controller is fixed on the main board, and the memory module includes the first memory and the second memory.

According to a fourth aspect, a computer system is provided, including a processor, a controller, a first memory, and a second memory, where the controller separately communicates with the processor, the first memory, and the second memory, where read/write performance of the first memory is higher than read/write performance of the second memory; and the controller is configured to perform any method in any one of the first aspect or the possible designs provided in the first aspect.

According to a fifth aspect, a chip system is provided, where the chip system includes any controller in any one of the second aspect or the possible designs provided in the second aspect, or includes any controller in any one of the third aspect or the possible designs provided in the third aspect.

According to a sixth aspect, a computer-readable storage medium, for example, a computer non-transitory readable storage medium, is provided. The computer-readable storage medium stores a computer program (or instructions). When the computer program (or instructions) runs on a computer, the computer is enabled to perform any method provided in any possible implementations of the first aspect.

According to a seventh aspect, a computer program product is provided. When the computer program product runs on a computer, any method provided in any one of the first aspect or the possible implementations of the first aspect is performed.

It may be understood that any controller, computer system, computer storage medium, computer program product, chip system, or the like provided above may be applied to the corresponding method provided above. Therefore, for beneficial effects that can be achieved by the controller, computer system, computer storage medium, computer program product, or chip system, refer to beneficial effects in the corresponding method. Details are not described herein again.

In this application, a name of the controller or the functional module does not constitute a limitation on the device or the functional module. During actual implementation, these devices or functional modules may have other names. The devices or the functional modules fall within the scope of the claims in this application and their equivalent technologies, provided that functions of the devices or the functional modules are similar to those in this application.

These aspects or other aspects in this application are more concise and comprehensible in the following descriptions.

DETAILED DESCRIPTION OF ILLUSTRATIVE EMBODIMENTS

The following describes some terms in embodiments of this application.

Memory Expansion

The memory expansion refers to increasing a memory capacity, a bandwidth, and the like.

Memory Persistence

A conventional DRAM memory is a solution to volatility. To be specific, data disappears after a power loss, critical data in a memory needs to be backed up at all times, and these data needs to be reloaded after power loss recovery. In a scenario in which there is a strict requirement on data integrity, memory persistence is increasingly required.

Data on which memory persistence is performed is not lost after a system is powered off.

Figure 2:
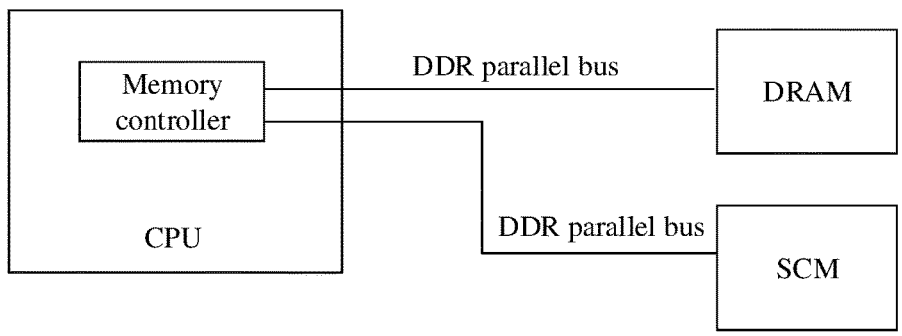
FIG. 2 is a schematic diagram of a system for expanding a memory capacity in a conventional technology.

A product (referred to as a conventional product below) that is proposed to resolve a problem of persistent memory expansion. The conventional product is in a form of a conventional 288-pin dual inline memory module (DIMM), and the conventional product is essentially an SCM. The technical essence of the conventional product is that shown in FIG. 2. In the technical solution, a DDR channel is additionally occupied, and consequently, memory capacity expansion is limited by a quantity of DDR channels.

Other Terms

In embodiments of this application, the word "example" or "for example" is used to represent giving an example, an illustration, or a description. Any embodiment or design scheme described as an "example" or "for example" in embodiments of this application shall not be explained as being more preferable or having more advantages than another embodiment or design scheme. Specifically, use of "example" and "for example" is intended to present a relative concept in a specific manner.

The terms "first" and "second" in embodiments of this application are merely intended for a purpose of description, and shall not be understood as an indication or implication of relative importance or implicit indication of a quantity of indicated technical features. Therefore, a feature limited by "first" or "second" may explicitly or implicitly include one or more features. In the descriptions of this application, unless otherwise specified, "a plurality of" means two or more than two.

The term "at least one" in this application means one or more, and the term "a plurality of" in this application means two or more than two. For example, "a plurality of second messages" means two or more than two second messages.

The terms "system" and "network" may be used interchangeably in this specification.

It should be understood that the terms used in the descriptions of the various examples in this specification are merely intended to describe specific examples, but are not intended to limit this specification. The terms "one" ("a", "an") and "the" of singular forms used in the descriptions of various examples and the appended claims are also intended to include plural forms, unless otherwise specified in the context clearly.

It should be further understood that the term "and/or" used in this specification indicates and includes any or all possible combinations of one or more items in associated listed items. The term "and/or" describes an association relationship for describing associated objects and represents that three relationships may exist. For example, A and/or B may represent the following three cases: Only A exists, both A and B exist, and only B exists. In addition, the character "/" in this application usually indicates an "or" relationship between associated objects.

It should be further understood that sequence numbers of the foregoing processes do not mean execution sequences in embodiments of this application. The execution sequences of the processes should be determined based on functions and internal logic of the processes, and should not be construed as any limitation on the implementation processes of embodiments of this application.

It should be understood that determining B based on A does not mean that B is determined based on only A, but B may alternatively be determined based on A and/or other information.

It should be further understood that the term "include" (also referred to as "includes", "including", "comprises", and/or "comprising"), when being used in this specification, specifies the presence of stated features, integers, steps, operations, elements, and/or components, but do not preclude the presence or addition of one or more other features, integers, steps, operations, elements, components, and/or groups thereof.

It should be further understood that the term "if" may be interpreted as a meaning "when" ("when" or "upon"), "in response to determining", or "in response to detecting". Similarly, according to the context, the phrase "if it is determined that" or "if (a stated condition or event) is detected" may be interpreted as a meaning of "when it is determined that", "in response to determining", "when (a stated condition or event) is detected", or "in response to detecting (a stated condition or event)".

It should be understood that "one embodiment", "an embodiment", or "a possible implementation" mentioned throughout specification means that particular features, structures, or characteristics related to embodiments or implementations are included in at least one embodiment of this application. Therefore, "in one embodiment", "in an embodiment", or "in a possible implementation" appearing throughout this specification does not necessarily refer to a same embodiment. In addition, these particular features, structures, or characteristics may be combined in one or more embodiments in any appropriate manner.

A computer system provided in embodiments of this application is described below with reference to the accompanying drawings.

Figure 3:
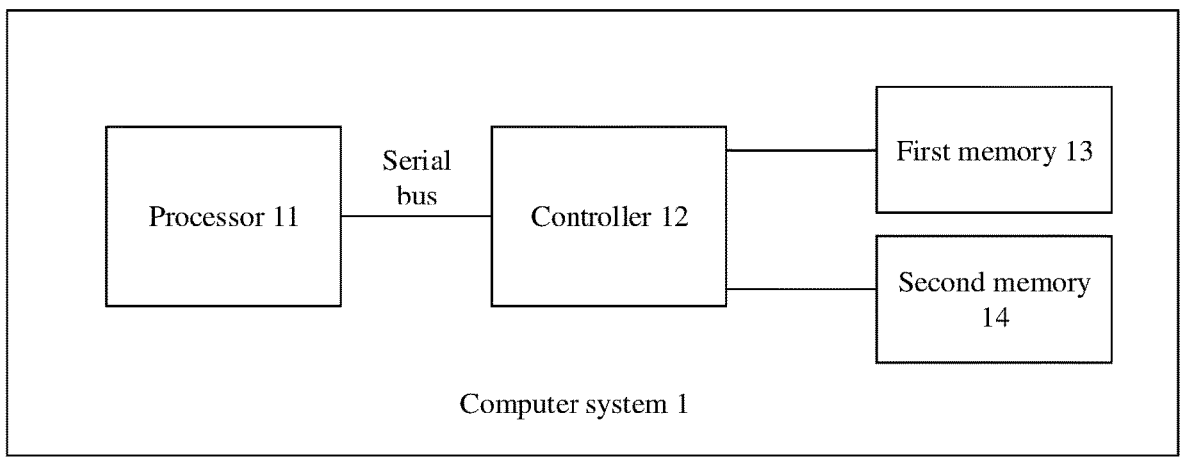
FIG. 3 is a schematic diagram of a structure of a computer system according to an embodiment of this application.

FIG. 3 is a schematic diagram of a structure of a computer system 1 according to an embodiment of this application. The computer system 1 shown in FIG. 3 includes a processor 11, a controller 12, a first memory 13, and a second memory 14. The controller 12 separately communicates with the processor 11, the first memory 13, and the second memory 14. In this embodiment of this application, the controller 12, the first memory, and the second memory may constitute a memory device. A specific product form is not limited in this embodiment. For example, the memory device may be a memory module. For another example, the memory device may include a main board and a memory module.

Optionally, the controller 12 may communicate with the processor 11 through a serial bus. For example, the serial bus may be a peripheral component interconnect express (PCIe) bus. Based on this, all specific examples below are described.

Optionally, the controller 12 may communicate with the processor 11 through a parallel bus.

The first memory 13 and the second memory 14 are memories of different types, and read/write performance of the first memory 13 is higher than read/write performance of the second memory 14 (for example, a read/write rate of the first memory 13 is higher than a read/write rate of the second memory). The first memory 13 and the second memory 14 are separately connected to the controller 12 through a memory interface.

Optionally, persistence performance of the first memory 13 is lower than persistence performance of the second memory 14.

For example, the first memory 13 is a DRAM, and the second memory 14 is an SCM. In this case, the first memory 13 is connected to the controller 12 based on a DRAM interface, and the second memory 14 is connected to the controller 12 based on an SCM interface.

For another example, the first memory 13 is a DRAM, and the second memory 14 is a Not AND (NAND) flash. The NAND flash is referred to as NAND for short below. In this case, the first memory 13 communicates with the controller 12 based on a DRAM interface, and the second memory 14 communicates with the controller 12 based on a NAND interface.

The processor 11 is configured to send read instructions and/or write instructions to the controller 12. The processor 11 may be a CPU or the like.

The controller 12 is configured to: read, based on the read instructions sent by the processor 11, data stored in the first memory 13, feed back the read data to the processor 11, and write data into the first memory 13 based on the write instructions sent by the processor 11. In addition, the controller 12 further has one or more of a function of controlling data swap in the first memory 13 and the second memory 14, a localized memory management function, an address mapping function, a hotspot data analysis function, a data prefetching and offloading management function, and the like. For related descriptions of these functions, refer to the following descriptions.

Specifically, the controller 12 may include a first memory controller and a second memory controller. The first memory controller is configured to perform reading/writing on the first memory 13, and the second memory controller is configured to perform reading/writing on the second memory 14. An example in which the first memory 13 is a DRAM, and the second memory 14 is an SCM is used. The first memory controller is specifically a DRAM controller (equivalent to a "memory controller" described in a conventional technology, such as the memory controller in FIG. 1). The second memory controller is specifically an SCM controller.

Optionally, the processor 11 may have a built-in memory controller, or may not have a built-in memory controller.

The computer system 1 shown in FIG. 3 is specifically described below by using a specific example.

Figure 4A:
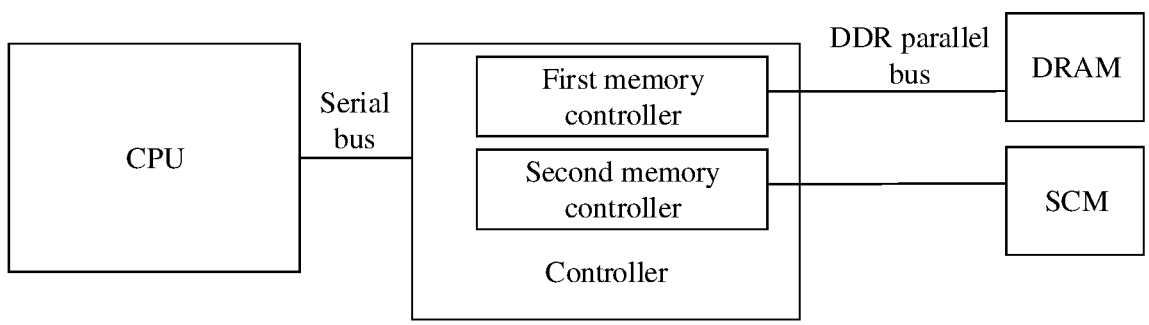
FIG. 4A is a schematic diagram of a structure of another computer system according to an embodiment of this application.
Figure 4B:
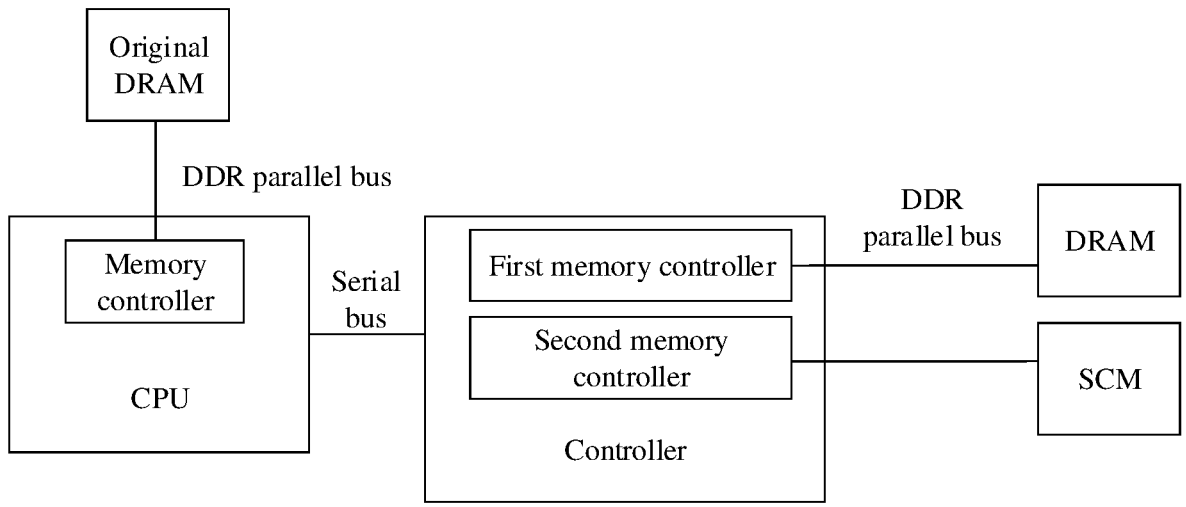
FIG. 4B is a schematic diagram of a structure of another computer system according to an embodiment of this application.

An example in which the processor 11 is specifically a CPU, the first memory 13 is specifically a DRAM, and the second memory 14 is specifically an SCM is used. The first memory controller in the controller 12 is configured to perform reading/writing on the DRAM. The second memory controller in the controller 12 is configured to perform reading/writing on the SCM. The first memory controller communicates with the DRAM through a DDR parallel bus. FIG. 4A and FIG. 4B are schematic diagrams of structures of two computer systems based on this example in this application.

Figure 1:
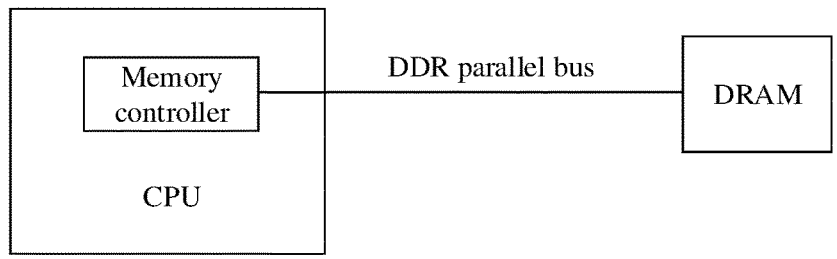
FIG. 1 is a schematic diagram of a connection relationship between a CPU and a DRAM in a conventional technology.

In the computer system shown in FIG. 4A, a CPU does not have a built-in memory controller. Compared with the computer system shown in FIG. 1, it may be considered that the computer system shown in FIG. 4A has improvements in that: First, the built-in memory controller in the CPU shown in FIG. 1 is moved outside the CPU. In other words, the built-in memory controller in the CPU shown in FIG. 1 and the first memory controller in the controller shown in FIG. 4A may be considered as a same device. Second, the second memory controller is disposed in the controller, to implement reading/writing on the newly added SCM. Third, a connection relationship between the controller and the CPU is added.

In the computer system shown in FIG. 4A, a memory capacity is specifically increased by adding the SCM, and the DDR parallel bus between the original memory controller (equivalent to the memory controller in FIG. 1) and the original DRAM (equivalent to the DRAM in FIG. 1) is not used in this solution. Therefore, memory capacity expansion is not limited by an original quantity of DDR channels. The DDR parallel bus between the original memory controller and the original DRAM is specifically a DDR parallel bus between the first memory controller and the DRAM in FIG. 4A.

In the computer system shown in FIG. 4B, a CPU has a built-in memory controller. Compared with the computer system shown in FIG. 1, it may be considered that the computer system shown in FIG. 4B has improvements in that: Based on FIG. 1, the CPU is connected to a controller through a serial bus, and the controller is further connected to a DRAM and an SCM respectively. In addition, a first memory controller and a second memory controller are disposed in the controller, to implement reading/writing on the newly added DRAM and SCM. In this embodiment, to distinguish between the DRAM connected to the built-in memory controller in the CPU and the DRAM connected to the first memory controller, in FIG. 4B, the DRAM connected to the built-in memory controller in the CPU is referred to as an "original DRAM".

In the computer system shown in FIG. 4B, a memory capacity is specifically increased by adding the DRAM and the SCM, and the DDR parallel bus between the original memory controller and the original DRAM is not used in this technical solution. Therefore, memory capacity expansion is not limited by an original quantity of DDR channels. The DDR parallel bus between the original memory controller and the original DRAM is specifically a DDR parallel bus between the built-in memory controller in the CPU and the original DRAM in FIG. 4B.

In addition, in the computer systems shown in FIG. 4A and FIG. 4B, the controller is responsible for reading/writing, swap, and the like of memory (including the DRAM and the SCM) data. Therefore, if the controller can write data into the DRAM preferably during data writing and read data from the DRAM preferably during data reading, the CPU senses that the CPU always accesses a large-capacity DRAM (where a large capacity herein is actually a capacity of the SCM, and the large capacity is relative to a capacity of the DRAM), but does not sense that the large-capacity DRAM is actually the SCM. For example, assuming that a capacity of the DRAM is 1 G and a capacity of the SCM is 10 G, the CPU can sense a memory capacity with a size of 10 G, and the DRAM of 1 G is used as a buffer of the SCM of 10 G.

On the one hand, because the CPU does not sense the newly added SCM, the CPU does not sense a data read/write process, a data swap process, and the like that are performed by the controller. Therefore, for the data read/write process, the data swap process, and the like, an application program does not need to be modified for adaptation, an operating system does not need to be installed with a corresponding driver, and a basic input/output system (BIOS) configuration is not needed.

It should be noted that, when data persistence is implemented in a conventional product, an application program needs to be modified for adaptation, an operating system needs to be installed with a corresponding driver, and a BIOS configuration is needed.

In addition, it should be noted that the technical solutions provided in embodiments of this application support partial persistence and full persistence of data written by the CPU. The data persistence may be considered as writing data from the DRAM to the SCM. For a specific process of persistence, refer to the following descriptions. It can be learned from the foregoing descriptions that, in a data persistence application scenario, the conventional product is compared with the technical solutions provided in embodiments of this application. The conventional product tends to move persistence management upward, and a degree of "softening (that is, software-based)" is high. The technical solutions provided in embodiments of this application tend to push persistence management down, and a degree of "hardening (that is, hardware-based)" is high.

On the other hand, because costs of the SCM are lower than costs of the DRAM, compared with a technical solution (for example, the technical solution shown in FIG. 2) of "the memory capacity is expanded by adding the additional DRAM" in an existing technology, this technical solution helps implement low-cost memory capacity expansion.

It should be noted that, even when there is no to-be-read data in the DRAM during actual implementation, the controller reads to-be-read data from the SCM. Therefore, a data swap policy and the like between the DRAM and the SCM need to be adjusted, to balance overall read/write performance and costs of the computer system and optimize overall performance of the computer system. For detailed descriptions of the data swap policy provided in embodiments of this application, refer to the following descriptions.

In conclusion, it can be learned that the computer system provided in embodiments of this application can implement memory capacity expansion. In addition, in one aspect, memory capacity expansion is not limited by an original quantity of DDR channels. In another aspect, compared with an existing technology (the technical solution shown in FIG. 2), costs of memory capacity expansion are low. In still another aspect, when the computer system implements a data read/write operation, an application program does not need to be modified for adaptation, an operating system does not need to be installed with a corresponding driver, and a BIOS configuration is not needed. Therefore, implementation is simple. In addition, in the technical solution, a memory bandwidth can be expanded when a memory capacity is expanded. The memory bandwidth expansion is described from a perspective of a serial bus. Because the serial bus does not occupy an original DDR channel of the CPU, the memory bandwidth can be expanded (or increased).

The computer system 1 shown in FIG. 3 provided in embodiments of this application is described in detail below.

Figure 5:
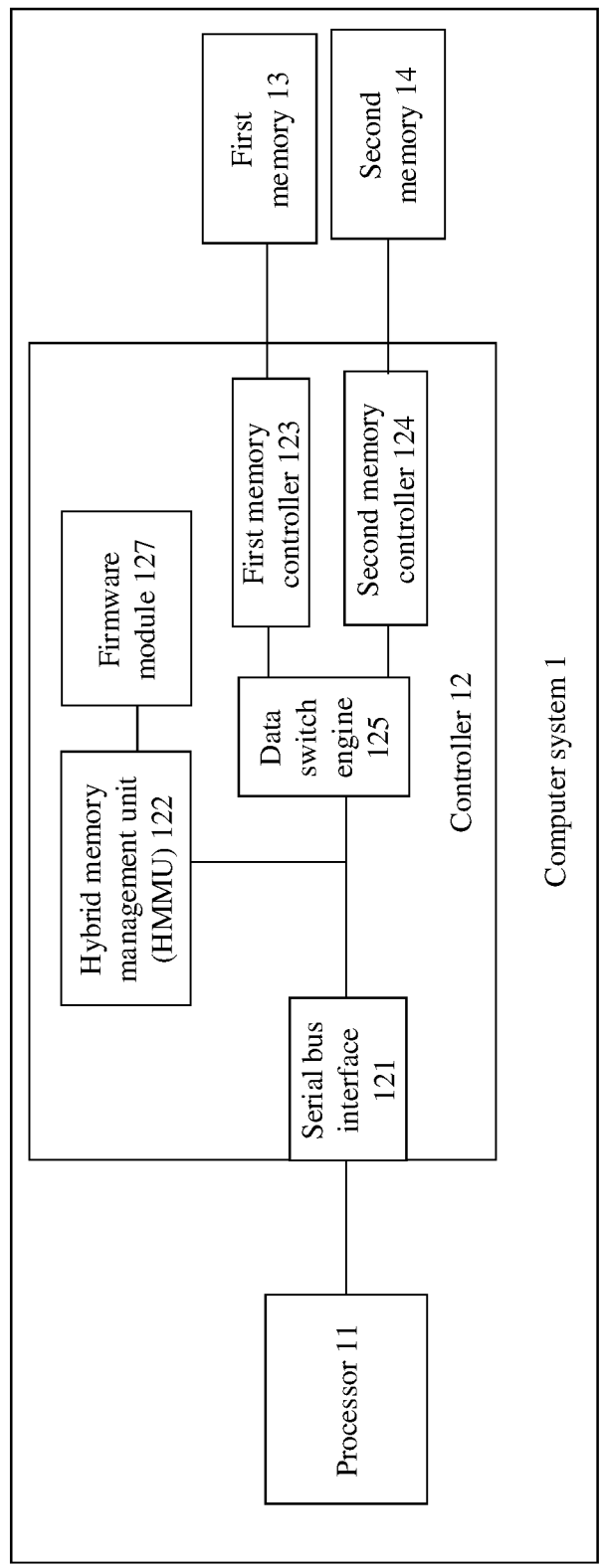
FIG. 5 is a schematic diagram of a structure of another computer system according to an embodiment of this application.

FIG. 5 is a schematic diagram of a structure of another computer system 1 according to an embodiment of this application. FIG. 5 is drawn based on FIG. 3. Specifically, the controller 12 in FIG. 3 may include the following modules/components:

A serial bus interface 121 is configured to perform communication between the controller 12 and a processor 11. Optionally, the serial bus interface 121 may be a front-end bus interface that supports memory semantics based on low-latency serial bus and high-speed Serdes serial-to-parallel conversion. A serdes is short for a serializer (SERializer)/deserializer (DESerializer).

A hybrid memory management unit (HMMU) 122 is configured to implement functions such as localized memory management, address mapping, hotspot data analysis, and data prefetching and offloading management with reference to features of a first memory 13 and a second memory 14.

A first memory controller 123 is configured to perform data read/write control and management on the first memory 13.

A second memory controller 124 is configured to perform data read/write control and management on the second memory 14.

A data switch engine 125 is a key module configured to open a hybrid medium datapath. The data switch engine 125 is separately connected to the first memory controller 123 and the second memory controller 124, and is configured to implement data swap between the first memory 13 and the second memory 14 by controlling the first memory controller 123 and the second memory controller 124. For example, data stored in the first memory 13 is read and written into the second memory 14, to implement data persistence. For another example, data stored in the second memory 14 is read and written into the first memory 13, so that the controller 12 quickly reads the data.

A firmware module 127 is a module configured to implement key algorithms such as memory persistence, hybrid medium management, and entry mapping.

It should be noted that, for a connection relationship between modules/components shown in FIG. 5, refer to FIG. 5. Details are not described herein again.

Figure 6:
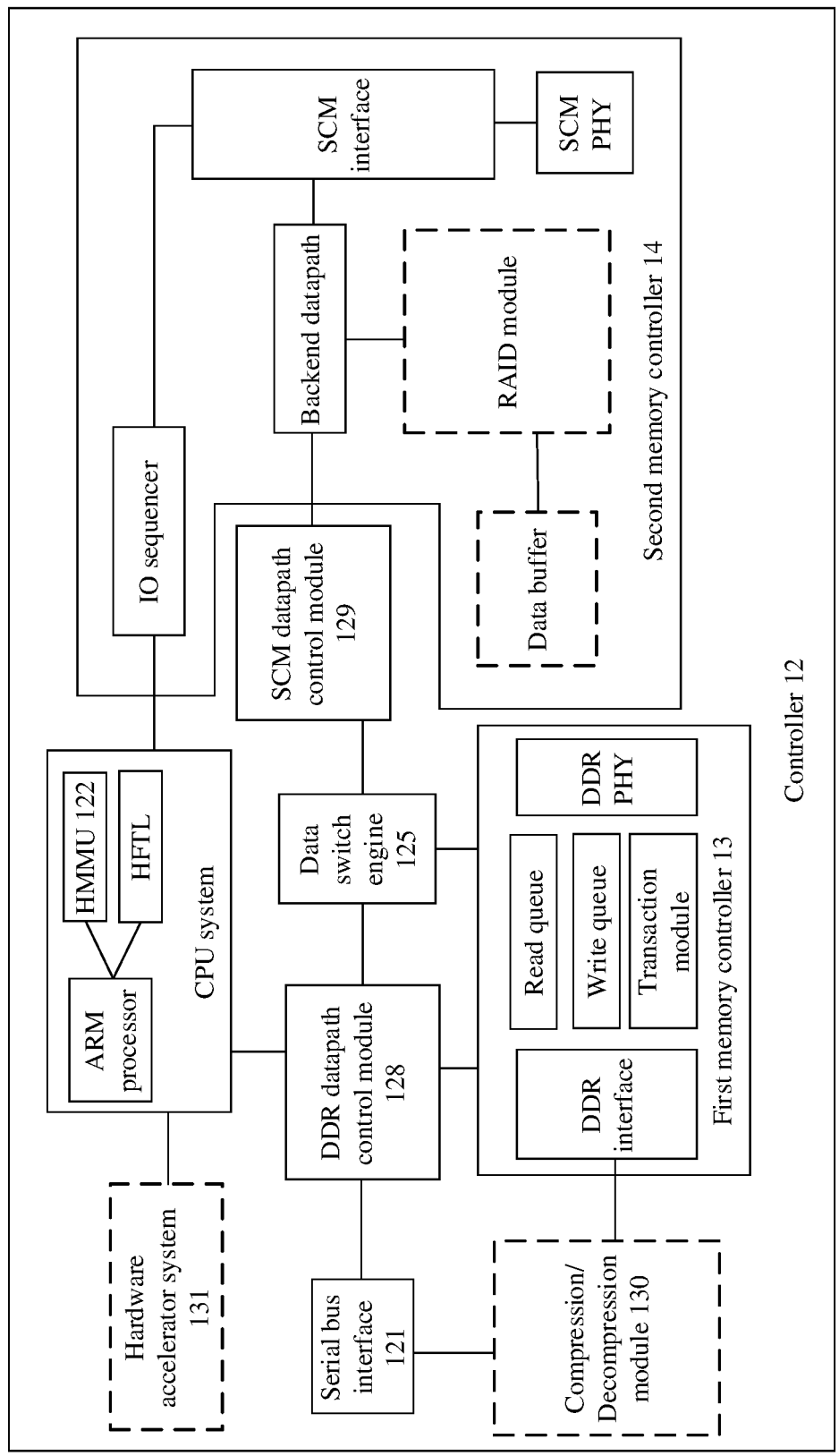
FIG. 6 is a schematic diagram of a structure of a controller according to an embodiment of this application.

FIG. 6 is a schematic diagram of a structure of a controller 12 according to an embodiment of this application. FIG. 6 is drawn based on FIG. 5. In addition, in FIG. 6, an example in which "a processor 11 is specifically a CPU, a first memory 13 is specifically a DRAM, and a second memory 14 is specifically an SCM" is used for description.

A serial bus interface 121 may include a port physical layer (PHY), a high-speed Serdes (HS Serdes), a memory protocol module, and the like. The PHY indicates a physical layer of a storage medium, the HS Serdes is configured to perform serial-to-parallel conversion, and the storage protocol module is configured to parse a protocol related to data storage, and the like.

A first memory controller 13 (specifically, a DRAM controller) may include: a read queue (read queue): a queue control module formed by all read requests in the first memory controller 12; a write queue (write queue): is a queue control module formed by all write requests in the first memory controller 13; a transaction (transaction) module: a control module that initiates a read/write operation command to the DRAM in the first memory controller 13, where the transaction module may also be referred to as an interaction module; a DDR interface (interface): a module of timing of initiating operation commands, such as read/write, to the DRAM; and a DDR PHY: a physical interface of the DRAM controller.

A second memory controller (specifically, an SCM controller) 14 may include: an TO sequencer: a module that schedules an TO read/write request of the SCM, where optionally, the TO sequencer may include a normal queue, an urgent queue, and the like; a backend datapath: a module for processing data on the SCM, including but not limited to at least one of the following modules: an error checking and correcting (ECC) module, a scramble (SCR) module, an encryption/decryption (crypto) module, or the like; an SCM interface: a module of timing of initiating operation commands, such as read/write, to the SCM; and an SCM PHY: a physical interface of the SCM controller.

Optionally, the second memory controller 124 may further include: a redundant array of independent disks (RAID) module: a module that performs a RAID operation on SCM data; and a data buffer: used as a buffer for reading and writing data of the SCM, for example, may be a static random-access memory (SRAM).

A firmware module 127 may include: a hybrid flash translation layer (HFTL): a Hybrid-FTL algorithm that supports hybrid medium entry management provided in embodiments of this application, to optimize memory semantics, and configured to implement access to the first memory or the second memory based on a logical address in an operation request from the processor, that is, implement mapping from a logical address to a physical address of the first memory or the second memory. The HFTL may be used to implement some functions of the firmware module 127. Certainly, the firmware module 127 may further include another functional module, to implement another function of the firmware module 127. In addition, for example, the HFTL and the HMMU 122 may be located in a CPU system of the controller 12. In addition, the CPU system may further include a CPU processor, for example, an ARM (advanced RISC machine) processor. An RISC is an abbreviation for reduced instruction set computer. It should be noted that the ARM processor may also be replaced with another type of processor, for example, an X86 processor. The following specific examples are described by using the ARM processor as an example.

Based on FIG. 5, the controller 12 may further include: a DDR datapath control module 128: a control module for initiating a read request to the DRAM controller; and an SCM datapath control module 129: a control module that initiates a read request to the SCM controller.

Optionally, the controller 12 may further include: a compression/decompression module 130: a hardware implementation of a high-performance memory compression/decompression algorithm, where the compression module and the decompression module may be implemented by using same hardware, or may be implemented by using different hardware, and certainly, at least one of the compression module and the decompression module may also be implemented by using software, or by combining software with hardware, and this is not limited in this embodiment of this application; and a hardware accelerator system 131: a high-performance hardware accelerator unit that can assist in accelerating HMMU and HFTL algorithms.

It should be noted that during actual implementation, entry management (such as addition, modification, or deletion) in the HMMU and the HFTL may be performed by the CPU processor (such as the ARM processor described in this specification) in the CPU system, or may be performed by the hardware accelerator system 131. For ease of description, in the following specific examples, an example in which entry management in the HMMU and the HFTL is performed by the ARM processor is used for description.

It may be understood that FIG. 6 is merely an example. During actual implementation, the controller 12 may further include more or fewer components/modules than those shown in FIG. 6. In addition, for a specific implementation of the modules shown in FIG. 6, refer to the corresponding existing technology provided that the technical solutions described in embodiments of this application do not conflict with the specific implementation.

It should be noted that, when the first memory 13 and the second memory 14 are memories of another type, a person skilled in the art may determine a specific implementation of the controller 12 based on the descriptions in FIG. 6. Details are not described herein again.

The following describes a specific implementation of the computer system 1 in terms of hardware implementation. In terms of hardware implementation, the controller 12 may be implemented by using a chip.

Figure 7:
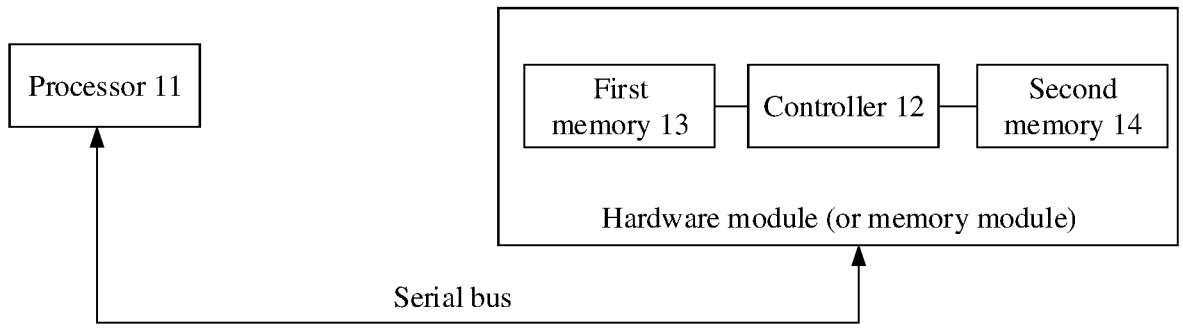
FIG. 7 is a schematic diagram of a hardware structure of a computer system according to an embodiment of this application.

In an implementation, as shown in FIG. 7, the controller 12, the first memory 13, and the second memory 14 may be integrated with a hardware module, and the hardware module may be interconnected with the processor 11 through a serial bus. This implementation can implement memory persistence of a single module. Optionally, the hardware module may be customized. For example, the hardware module may also be referred to as a memory expansion module or a memory module. In other words, the memory device described above specifically exists in a form of the memory module.

For example, the first memory 13 is a DRAM, and the second memory 14 is an SCM. A form of the hardware module may be similar to a form of a standard DIMM. A difference lies in that a DRAM chip is pasted on the DIMM and a parallel bus is used, but a hybrid medium chip (such as the DRAM chip and an SCM chip) is pasted on the hardware module and a serial bus is used. During specific implementation, the processor 11 may support access to the hardware module on the serial bus through customized semantics.

Figure 8:
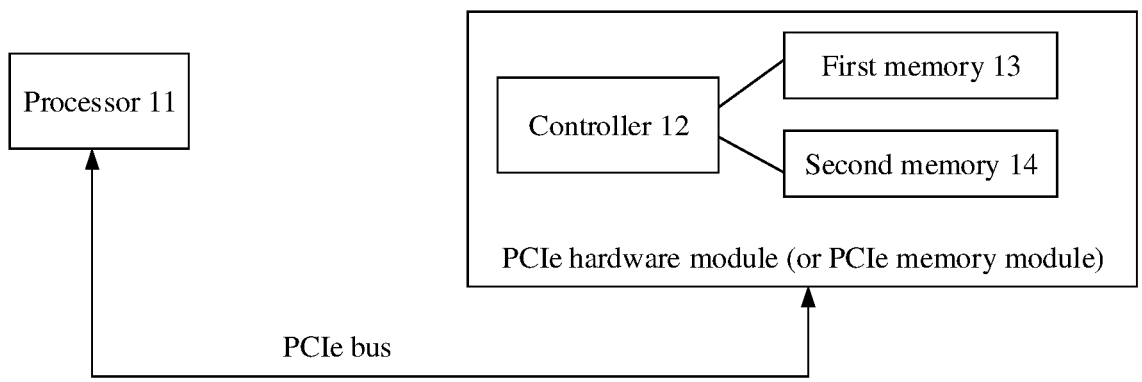
FIG. 8 is a schematic diagram of a hardware structure of another computer system according to an embodiment of this application.

Optionally, the hardware module may be a standard PCIe module. The PCIe module is interconnected with the processor 11 through a PCIe bus. As shown in FIG. 8, in this implementation, the hardware module may be customized. During specific implementation, the processor 11 may support access to the hardware module on the PCIe bus. A form of the module is similar to a form of a standard PCIe disk. For example, the first memory 13 is a DRAM, and the second memory 14 is an SCM. A difference between the form of the module and the form of the standard PCIe disk lies in that a NAND is pasted on the standard PCIe disk and only IO semantics (Block semantics) is supported, but a hybrid medium chip is pasted on the module and only memory semantics is supported.

During specific implementation, in the solution, hardware needs to be customized, the IO semantics needs to be converted into memory semantics through the standard PCIe bus, and an access bandwidth is limited by the PCIe standard (for example, a single lane bandwidth of the PCIe 4.0 is 2 GB/s).

Figure 9:
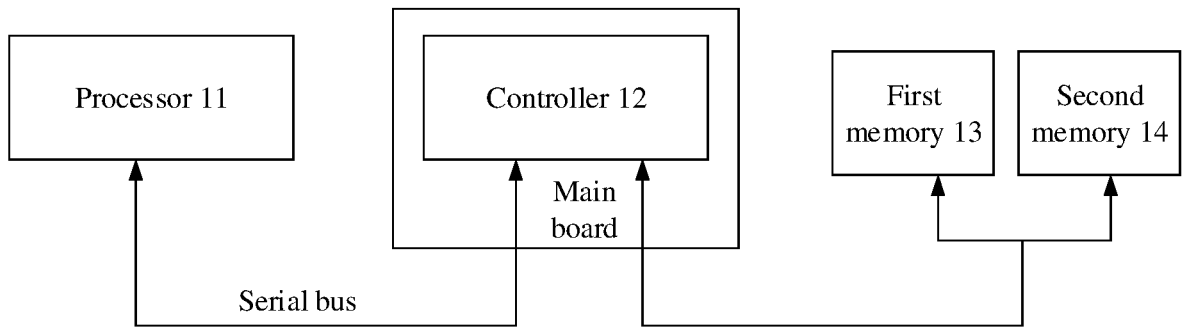
FIG. 9 is a schematic diagram of a hardware structure of another computer system according to an embodiment of this application.

In another implementation, as shown in FIG. 9, the controller 12 may be welded to a main board. One side is interconnected with the processor 11 through a serial bus. The other side may be connected to the first memory 13 and the second memory 14. For example, the first memory 13 is a DRAM, and the second memory 14 is an SCM. The other side may be connected to a DRAM memory board in a standard DIMM form and an SCM memory board in a customized DIMM form. In this case, the memory device described above specifically exists in a form of the main board, the first memory, and the second memory. Optionally, the first memory and the second memory are located in the hardware module (or the memory module). In this case, the memory device described above specifically exists in a form of the main board and the memory module.

During specific implementation, in the solution, the controller 12 is welded to the main board, and the DRAM memory board and the customized SCM memory board are inserted into a standard DIMM slot of the main board, so that memory expansion and persistence can be implemented, and a hybrid medium memory board can also be directly customized. In the solution, a position of the controller 12 needs to be reserved on the main board to implement memory expansion and persistence, and an expansion capability is limited by a maximum quantity of channels supported by a single chip.

It may be understood that, based on any one of the foregoing implementations, a capacity of the first memory 13 and a capacity of the second memory 14 may be configured based on one or more of conditions such as performance of the first memory 13 and performance of the second memory 14, costs of the hardware module, and an application scenario. This is not limited in embodiments of this application.

With reference to the accompanying drawings, the following describes a data read/write process and a data swap process provided in embodiments of this application.

Data Write Process

Figure 10A:
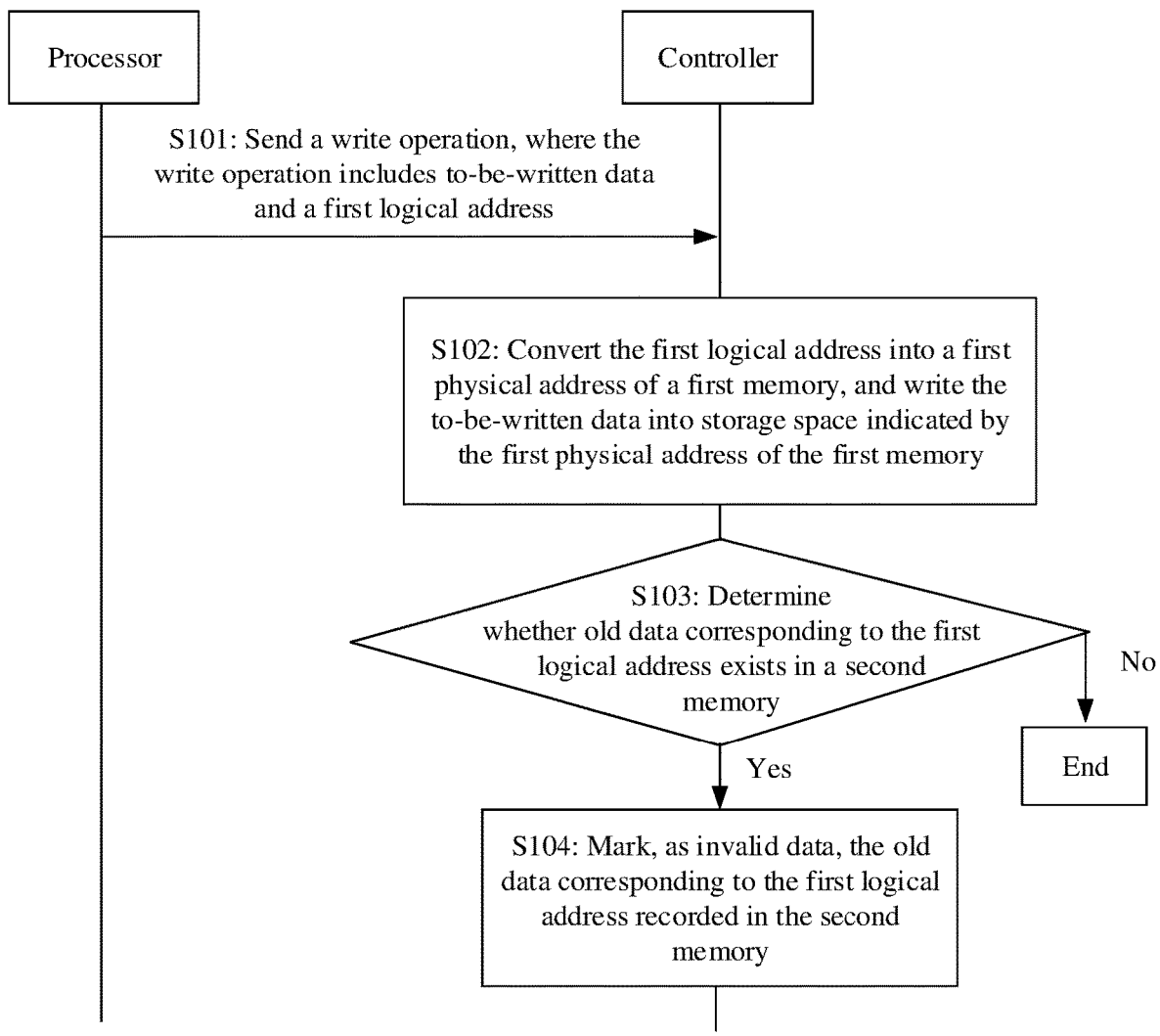
FIG. 10A is a schematic flowchart of a data write method according to an embodiment of this application.

FIG. 10A is a schematic flowchart of a data write method according to an embodiment of this application. The method shown in FIG. 10A may be applied to the computer system shown in FIG. 3. The method shown in FIG. 10A may include the following steps.

S101: A processor sends a write operation to a controller, where the write operation includes to-be-written data and a first logical address.

It should be noted that, for the processor, an address carried in the write operation is a physical address. For the controller, an address carried in the write operation is a logical address. Herein, an example is used for description in terms of the controller.

S102: The controller converts a first logical address into a first physical address of a first memory, and writes the to-be-written data into storage space indicated by the first physical address of the first memory. Then, the controller updates HMMU information maintained by the controller.

Optionally, that the controller updates HMMU information maintained by the controller may include: The controller writes first information into the HMMU information maintained by the controller, where the first information is used to indicate that data of the first logical address has been buffered to the first memory.

For example, S102 may be considered as a data buffer process.

S103: The controller determines whether old data corresponding to the first logical address exists in a second memory. In other words, the controller determines whether data is stored in storage space indicated by a physical address of the second memory obtained through conversion of the first logical address.

If the data is stored in the storage space indicated by the physical address of the second memory obtained through conversion of the first logical address, it indicates that the old data corresponding to the first logical address has been flushed to the second memory, and S104 is performed.

If the data is not stored in the storage space indicated by the physical address of the second memory obtained through conversion of the first logical address, the data write process ends.

The old data herein is relative to the to-be-written data in S101, and both the old data and the to-be-written data are data corresponding to the first logical address. However, in terms of write time, the old data is written first, and the to-be-written data is written later.

S104: The controller marks, as invalid data, the old data corresponding to the first logical address recorded in the second memory.

It should be noted that subsequently, the invalid data may be deleted when garbage collection (GC) is performed, to save storage space.

After S104 is performed, the data write process ends.

In this embodiment, the controller preferably writes data into the first memory. Because read/write performance of the first memory is higher than read/write performance of the second memory, this embodiment helps improve data write efficiency.

Figure 10B:
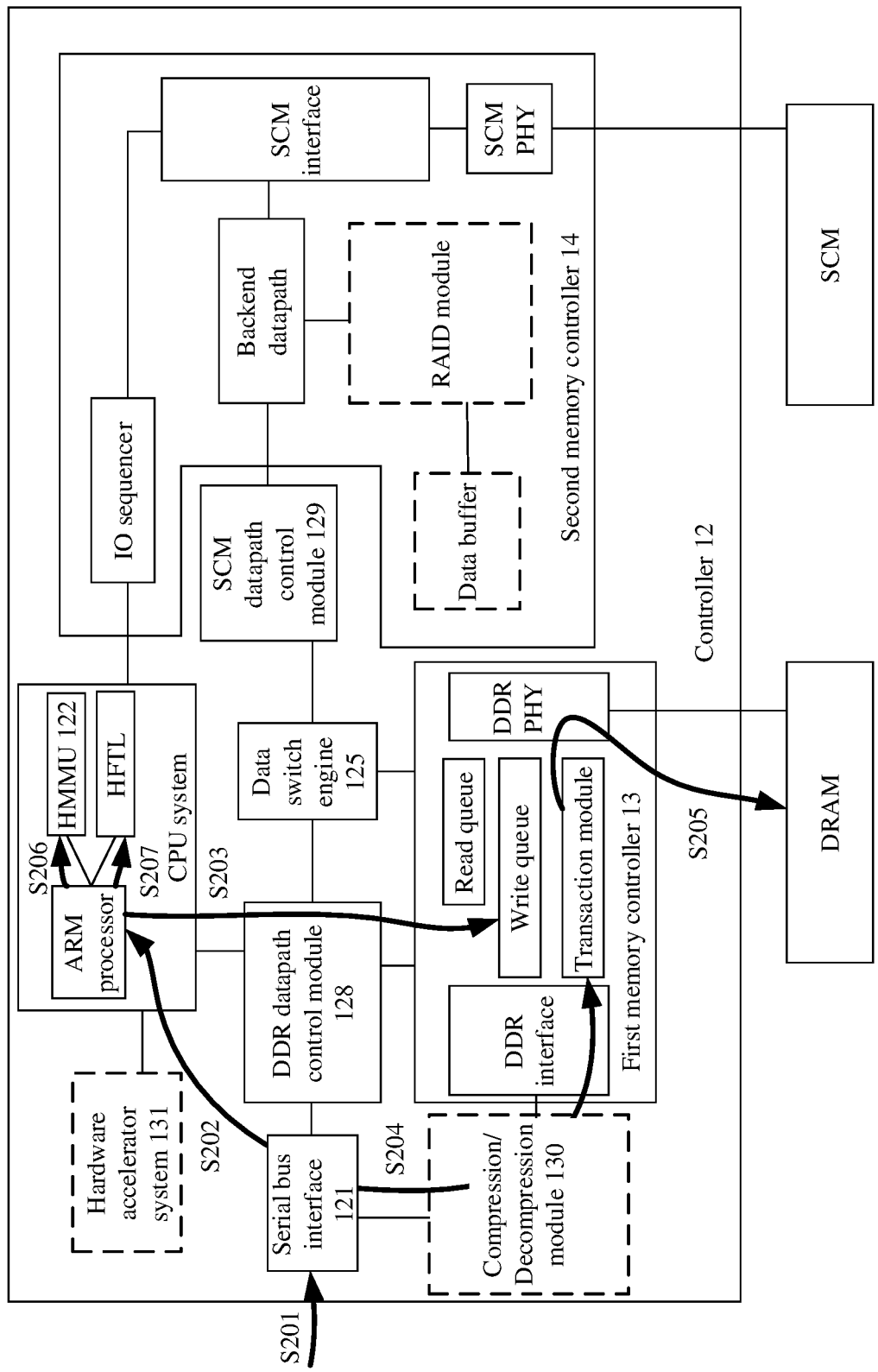
FIG. 10B is a schematic diagram of a process in which a controller performs a data write method based on FIG. 10A according to an embodiment of this application.

FIG. 10B is a schematic diagram of a process in which a controller performs a data write method based on FIG. 10A according to an embodiment of this application. The method shown in FIG. 10B may be applied to the controller shown in FIG. 6. The method shown in FIG. 10B may include the following steps.

S201: A serial bus interface receives a write operation sent by a processor, and parses the write operation. The write operation includes to-be-written data and a first logical address.

Specifically, a PHY in the serial bus interface receives the write operation sent by the processor, and an HS Serdes performs serial-to-parallel conversion on the write operation with reference to a memory protocol (that is, a parallel transmission protocol). A process of performing serial-to-parallel conversion on the write operation may be considered as a specific implementation of parsing the write operation.

S202: The serial bus interface sends, to a CPU system, the first logical address obtained after the write operation is parsed.

S203: An ARM processor in the CPU system converts the first logical address into a first physical address based on a correspondence between a logical address and a DRAM physical address. Then, the first physical address is sent to a DDR datapath control module, and the DDR datapath control module sends DRAM write instructions to a write queue in a DRAM controller, where the DRAM write instructions include the first physical address.

S204: The serial bus interface sends, to a compression module for compression, the to-be-written data obtained after the write operation is parsed, and the compression module sends compressed to-be-written data to a transaction module in the DRAM controller through a DDR interface of the DRAM controller.

A sequence of performing S203 and S204 is not limited in this embodiment of this application.

S205: The transaction module in the DRAM controller writes, based on the DRAM write instructions received by the write queue, the to-be-written data into storage space indicated by the first physical address of a DRAM. Subsequently, the DRAM controller sends a write complete response of the to-be-written data to the ARM processor in the CPU system, so that the ARM processor in the CPU system performs S206.

Optionally, S203 and S206 may be performed in parallel. In other words, when S206 is performed, there is no need to wait for the DRAM controller to send the write complete response of the to-be-written data to the ARM processor in the CPU system. This helps reduce pressure of the ARM processor.

S206: The ARM processor in the CPU system updates HMMU information. Specifically, first information is added to the HMMU information, and the first information is used to indicate that data of the first logical address has been buffered to the DRAM.

S207: If determining that old data corresponding to the first logical address already exists in an SCM, the ARM processor in the CPU system marks the old data as invalid data.

Subsequently, when executing an invalid data collection mechanism, an SCM controller may delete, based on an execution result of S207, data in storage space corresponding to a second physical address in the SCM. The second physical address is a physical address converted from the first logical address to the SCM.

In the technical solutions shown in FIG. 10A and FIG. 10B, an example in which data is written and read at a data read/write granularity of the first memory is used for description. This does not constitute a limitation during specific implementation. For example, a data read/write granularity of the second memory is generally greater than the data read/write granularity of the first memory. For example, the first memory is a DRAM and the second memory is an SCM. A data read/write granularity of the DRAM may be 8 bytes, and a data read granularity of the SCM is a page. For example, a size of the page is 4 K bytes. In an example, after receiving the write operation that includes the to-be-written data and the first logical address, the controller may determine whether data of a logical page in which the first logical address is located already exists in the first memory. If the data of the logical page in which the first logical address is located already exists in the first memory, the to-be-written data is written into storage space indicated by a physical address corresponding to the first logical address of the first memory. If the data of the logical page in which the first logical address is located does not exist in the first memory, data corresponding to a logical page in which the first logical address is located is read from the second memory, data corresponding to the first logical address in the read data is replaced with the to-be-written data, to obtain new data corresponding to the logical page in which the first logical address is located, and the new data corresponding to the logical page in which the first logical address is located is written into storage space indicated by a physical address corresponding to the logical page in the first memory. Subsequently, the controller may mark the data corresponding to the logical page in which the first logical address is located in the second memory as invalid data. In the technical solution, it can be ensured that all data corresponding to one page is in the first memory and/or the second memory, to improve data read efficiency. A process of how to read data in this case is not described herein again.

Process of Swapping Data from a First Memory to a Second Memory

Figure 11A:
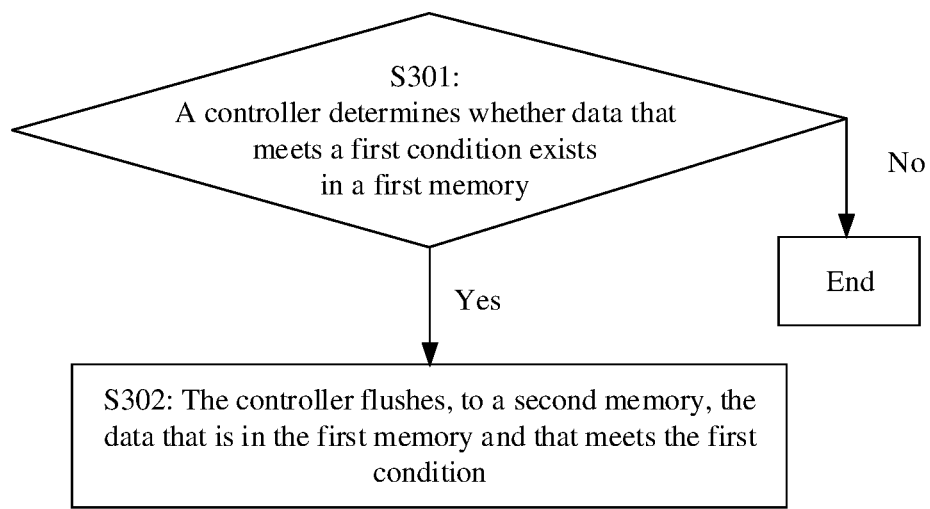
FIG. 11A is a schematic flowchart of a method for swapping data from a first memory to a second memory according to an embodiment of this application.

FIG. 11A is a schematic flowchart of a method for swapping data from a first memory to a second memory according to an embodiment of this application. The method shown in FIG. 11A may be applied to the computer system shown in FIG. 3. The method shown in FIG. 11A may include the following steps.

S301: A controller determines whether data that meets a first condition exists in a first memory. That the data that meets the first condition exists in the first memory may be considered as that data that meets a criterion for flushing to a second memory exists in the first memory.

If the data that meets the first condition exists in the first memory, S302 is performed. If the data that meets the first condition does not exist in the first memory, return to perform S301 when a trigger condition of S301 is met next time.

Optionally, the data that meets the first condition includes at least one of the following: data in the first memory when a data amount is greater than or equal to a first threshold; data whose storage time is greater than or equal to a second threshold; or data whose probability of having a read hit is less than or equal to a third threshold, where for example, within a preset time period, the data whose probability of having the read hit in the first memory is less than or equal to the third threshold.

For example, the first threshold, the second threshold, and the third threshold may be respectively considered as a space threshold, a time threshold, and a data temperature threshold. In other words, in this embodiment of this application, whether data in the first memory meets the criterion for flushing to the second memory may be determined based on at least one of the space threshold, the time threshold, the data temperature threshold, and the like. Certainly, this does not constitute a limitation during specific implementation. For example, if a ratio of a data amount of data stored in the first memory to a total data amount of the first memory is greater than or equal to a fourth threshold, it is considered that the data stored in the first memory meets the first condition.

In this embodiment of this application, a trigger condition for performing S301 by the controller is not limited. For example, the controller may periodically perform S301 or trigger S301 to be performed. For example, that the controller triggers S301 to be performed may include: After performing S104 one or more times, the controller performs S301. In other words, after performing the data write process one or more times, the controller performs S301. For another example, a specific example in which the controller triggers S301 to be performed may be included in the embodiment shown in FIG. 12 below. For details, refer to the following descriptions.

S302: The controller flushes, to the second memory, the data that is in the first memory and that meets the first condition. Specifically, the controller reads the data that is in the first memory and that meets the first condition, and stores the read data into the second memory.

For example, because persistence performance of the first memory is lower than persistence performance of the second memory, a process of flushing data in the first memory to the second memory may be considered as a data persistence process. In this embodiment of this application, when the data that meets the first condition exists in the first memory, the controller performs the data persistence process. In this way, on the one hand, storage space of the first memory is released, so that the processor can continue to store data into the first memory, to implement memory capacity expansion. On the other hand, compared with some conventional technologies in which data persistence is performed only when a system is powered off, the technical solution does not need to specifically set a large-capacity battery-protected power supply for data persistence, and therefore helps reduce costs.

After S302 is performed, the current data persistence process ends.

In this embodiment, when the data that meets the first condition exists in the first memory, the controller swaps the data that meets the first condition from the first memory to the second memory. Optionally, the controller may delete the swapped-out data from the first memory. In this way, on the one hand, the storage space of the first memory is released, so that the processor can write more data into the first memory. On the other hand, data stored in the second memory is usually not lost when the system is powered off. Therefore, data persistence can be implemented. Certainly, persistence herein may refer to persistence of some or all data written by the processor.

Figure 11B:
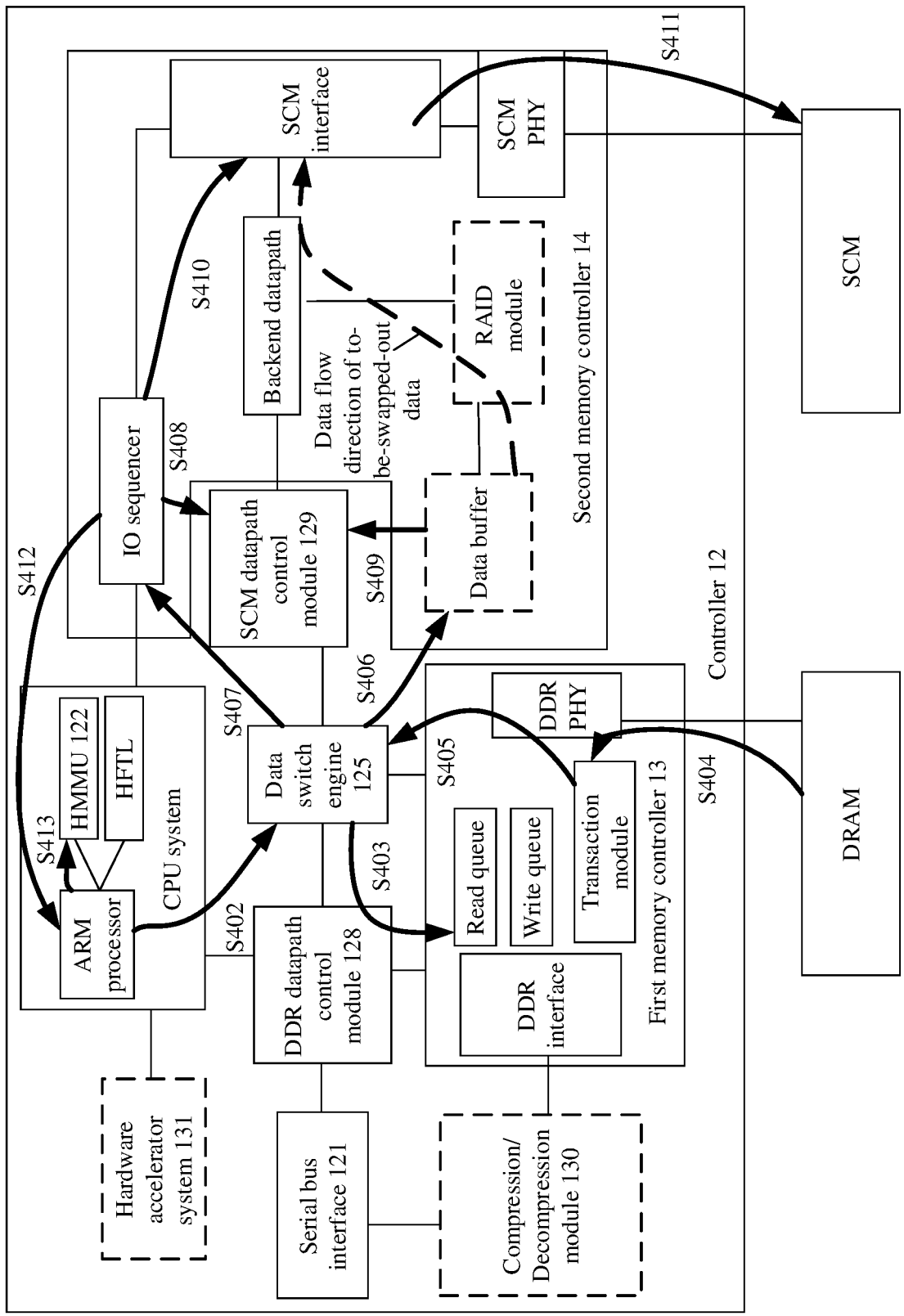
FIG. 11B is a schematic diagram of a process in which a controller performs a method for swapping data from a first memory to a second memory based on FIG. 11A according to an embodiment of this application.

FIG. 11B is a schematic diagram of a process in which a controller performs a method for swapping data from a first memory to a second memory based on FIG. 11A according to an embodiment of this application. The method shown in FIG. 11B may be applied to the controller shown in FIG. 6. The method shown in FIG. 11B may include the following steps.

S401: An ARM processor in a CPU system determines whether data that meets a first condition exists in a DRAM.

If the data that meets the first condition exists in the DRAM, S402 is performed. If the data that meets the first condition does not exist in the DRAM, return to perform S401 when a trigger condition of S401 is met next time.

S402: The ARM processor in the CPU system sends a DRAM data swap command to a data switch engine. The DRAM data swap command is used to swap to-be-swapped-out data in the DRAM to an SCM.

Optionally, the ARM processor in the CPU system may further send a physical address and a page size of the to-be-swapped-out data in the DRAM, physical page information of the SCM, and the like to the data switch engine. Alternatively, optionally, one or more of a physical address of the to-be-swapped-out data in the DRAM, a page size of the to-be-swapped-out data in the DRAM, or physical page information of the SCM may be carried in the DRAM data swap command.

S403: The data switch engine sends memory read instructions to a read queue of a DRAM controller through a DDR datapath control module. The memory read instructions include the physical address of the to-be-swapped-out data in the DRAM.

S404: A transaction module in the DRAM controller reads the to-be-swapped-out data from the DRAM based on the memory read instructions received by the read queue.

S405: The transaction module in the DRAM controller returns the read to-be-swapped-out data to the data switch engine.

S406: The data switch engine writes, into pre-allocated data buffer space, the to-be-swapped-out data returned by the DRAM controller.

S407: The data switch engine sends, to an IO sequencer, instructions for flushing the to-be-swapped-out data to the SCM, and notifies the IO sequencer of location information and the like of the to-be-swapped-out data in the data buffer space.

S408: The IO sequencer delivers data write instructions to an SCM datapath control module, to activate an operation corresponding to the to-be-swapped-out data, and allocates a path resource for the to-be-swapped-out data. The data write instructions include the location information and the like of the to-be-swapped-out data in the data buffer space. The operation includes but is not limited to at least one of the following: a cyclic redundancy check (CRC), a scrambling operation, an ECC operation, an RAID operation, an encryption operation, or the like.

S409: The SCM datapath control module captures the to-be-swapped-out data from the data buffer space based on the data write instructions delivered by the IO sequencer.

Subsequently, the SCM datapath control module sends a to-be-swapped-out data capture completion response (not shown in FIG. 11B) to the IO sequencer. Subsequently, the to-be-swapped-out data is sent to an SCM interface through modules such as an RAID module and a backend datapath from the data buffer space. A dashed line with an arrow in FIG. 11B shows a data flow direction of the to-be-swapped-out data. It should be noted that, during actual implementation, the SCM datapath control module may send instructions to the backend datapath, to enable a data flow direction path of the to-be-swapped-out data.

S410: The IO sequencer delivers data write instructions to the SCM interface and configures corresponding physical information of the SCM.

A sequence of performing S408 and S410 is not limited in this embodiment of this application. For example, S408 and S410 may be performed simultaneously or sequentially.

S411: After receiving the to-be-swapped-out data, the SCM interface delivers, based on the data write instructions delivered by the IO sequencer and the physical information that is configured in S410, a write command sequence for the SCM, and transmits the to-be-swapped-out data to the SCM.

Subsequently, the SCM interface sends, to the IO sequencer, a response indicating that the to-be-swapped-out data has been written into the SCM.

S412: The IO sequencer sends HFTL report write command completion to the ARM processor in the CPU system, so that the ARM processor updates corresponding entry information of an HFTL. For a specific example of the updated entry information, refer to S207.

Specifically, after receiving the to-be-swapped-out data capture completion response (as described in S409) sent by the SCM datapath control module and the response indicating that the to-be-swapped-out data sent by the SCM interface has been written into the SCM (as described in S411), the IO sequencer may perform S412.

S413: The ARM processor in the CPU system updates corresponding entry information of an HMMU. For a specific example of the updated entry information, refer to S206.

Figure 12:
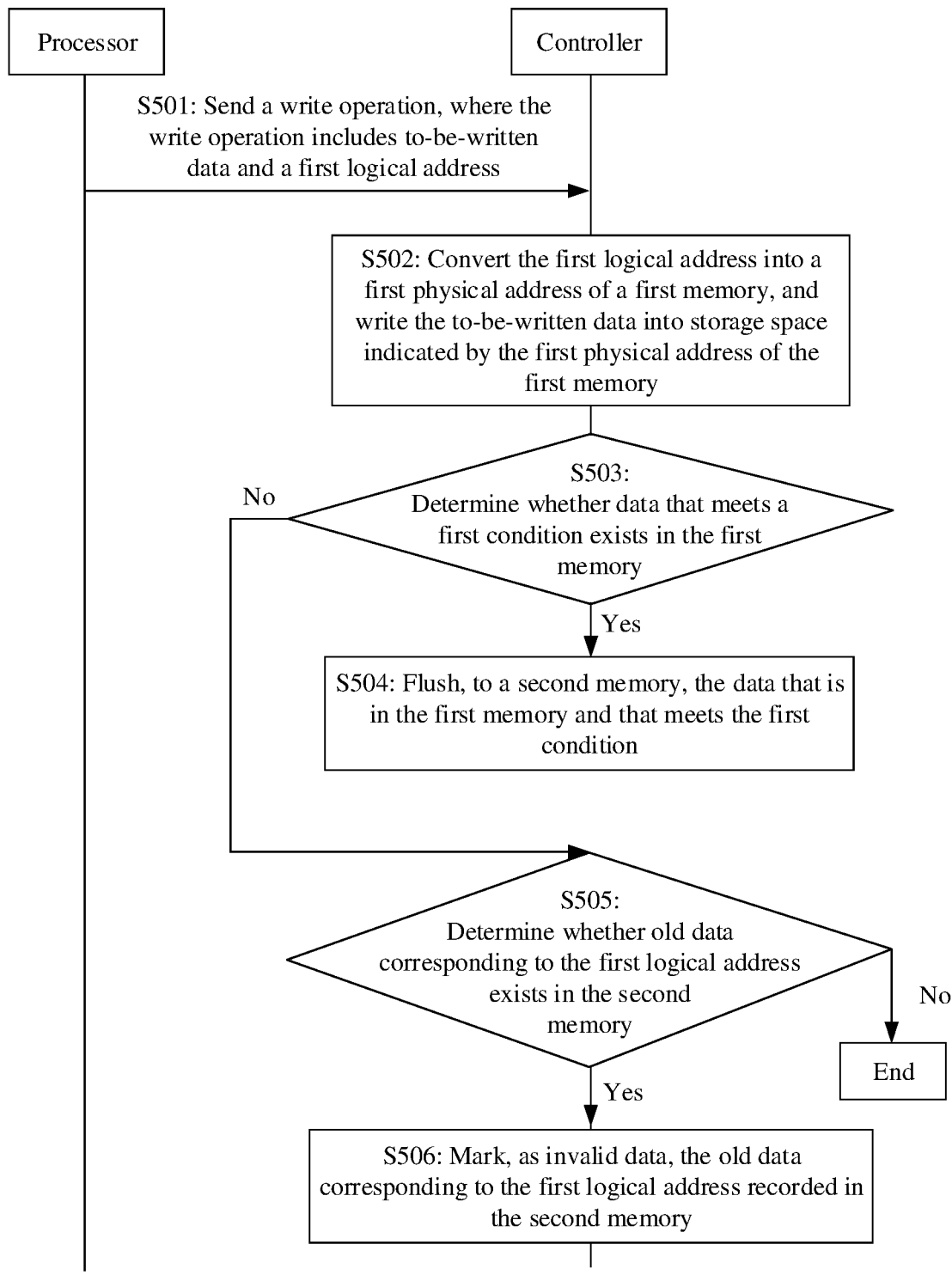
FIG. 12 is a schematic flowchart of a method for writing data and swapping data from a first memory to a second memory according to an embodiment of this application.

Process of Writing Data and Swapping Data from a First Memory to a Second Memory FIG. 10A specifically describes the data write process, and FIG. 11A specifically describes the data persistence process. FIG. 12 specifically describes an application example of a combination of the two processes below.

FIG. 12 is a schematic flowchart of a method for writing data and swapping data from a first memory to a second memory according to an embodiment of this application. The method shown in FIG. 12 includes the following steps.

S501 and S502: Refer to S101 and S102.

S503: A controller determines whether data that meets a first condition exists in a first memory. For details, refer to S301.

If the data that meets the first condition exists in the first memory, S504 is performed. If the data that meets the first condition does not exist in the first memory, S505 is performed.

S504: The controller flushes, to a second memory, the data that is in the first memory and that meets the first condition. For details, refer to S302.

After S504 is performed, the current data persistence process ends.

S505: The controller determines whether old data corresponding to a first logical address exists in the second memory. For details, refer to S103.

If the old data corresponding to the first logical address exists in the second memory, S506 is performed. If the old data corresponding to the first logical address does not exist in the second memory, the current data write process ends.

S506: The controller marks, as invalid data, the old data corresponding to the first logical address recorded in the second memory. For details, refer to S104.

After S506 is performed, the current data write process ends.

FIG. 12 is compared with FIG. 10A, it can be learned that in the technical solution shown in FIG. 10A, a prerequisite for the controller to mark the old data corresponding to the first logical address recorded in the second memory as the invalid data is that the old data is marked after the data is buffered to the first memory and it is determined that the old data corresponding to the first logical address exists in the second memory. However, in the technical solution shown in FIG. 12, a prerequisite for the controller to mark the old data corresponding to the first logical address recorded in the second memory as the invalid data is that the old data is marked after the data is buffered to the first memory and it is determined that the old data corresponding to the first logical address exists in the second memory and a flushing criterion is met. This is because if the flushing criterion is met, the data corresponding to the first logical address in the second memory has been updated to latest data. As a result, the data does not need to be marked as invalid data. In this way, a processing process can be reduced, to improve processing efficiency.

Data Read Process

Figure 13A:
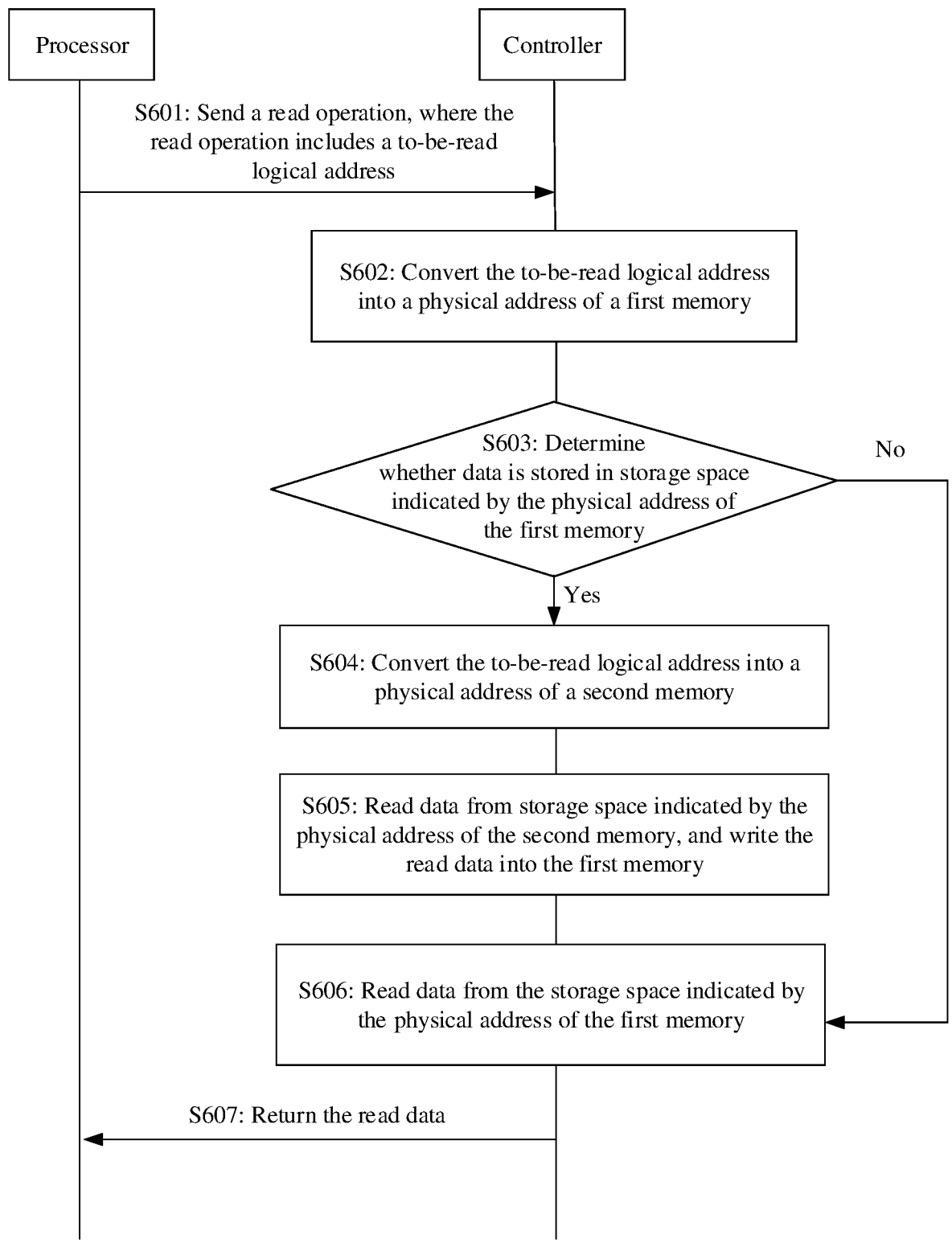
FIG. 13A is a schematic flowchart of a data read method according to an embodiment of this application.

FIG. 13A is a schematic flowchart of a data read method according to an embodiment of this application. The method shown in FIG. 13A may be applied to the computer system shown in FIG. 3. The method shown in FIG. 13A may include the following steps.

S601: A processor sends a read operation to a controller, where the read operation includes a to-be-read logical address.

S602: The controller converts the to-be-read logical address into a physical address of a first memory S603: The controller determines whether data is stored in storage space indicated by the physical address of the first memory.

If the data is not stored in the storage space indicated by the physical address of the first memory, S604 is performed. If the data is stored in the storage space indicated by the physical address of the first memory, S606 is performed.

S604: The controller converts the to-be-read logical address into a physical address of a second memory.

S605: The controller reads data from storage space indicated by the physical address of the second memory, and writes the read data into the first memory.

S606: The controller reads data from the storage space indicated by the physical address of the first memory.

S607: The controller returns the read data to the processor.

After S607 is performed, the current data read process ends.

In this embodiment, the controller preferably reads to-be-read data from the first memory. Because read/write performance of the first memory is higher than read/write performance of the second memory, the technical solution helps improve a data read rate.

Figure 13B:
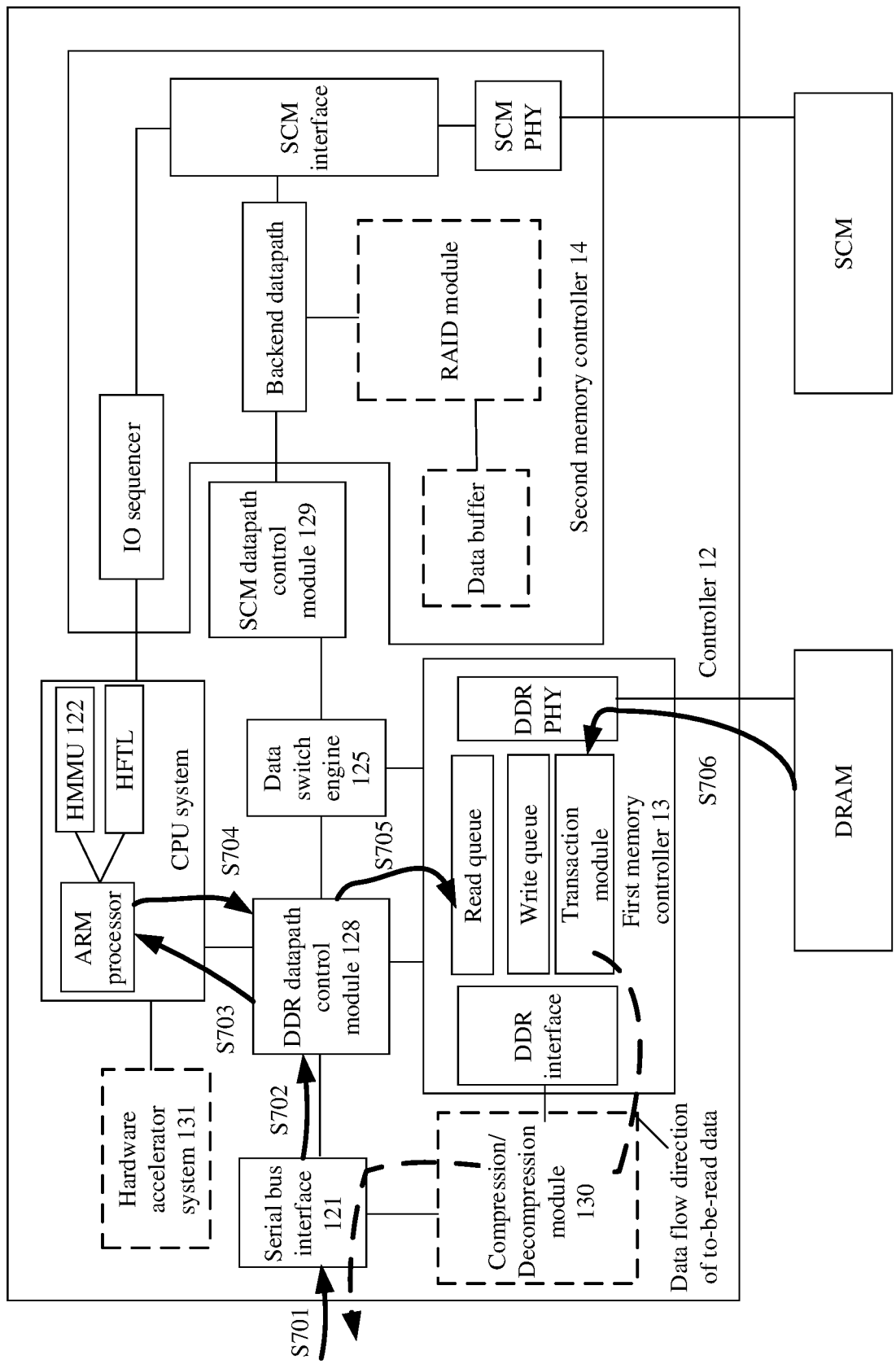
FIG. 13B is a schematic diagram of a process in which a controller performs data reading based on FIG. 13A according to an embodiment of this application.

FIG. 13B is a schematic diagram of a process in which a controller performs data reading based on FIG. 13A according to an embodiment of this application. The method shown in FIG. 13B may be applied to the controller shown in FIG. 6. The method shown in FIG. 13B may include the following steps.

S701: A serial bus interface receives a read operation sent by a processor, and parses the read operation. The operation includes a to-be-read logical address.

Specifically, a PHY in the serial bus interface receives the read operation sent by the processor, and an HS Serdes performs serial-to-parallel conversion on the read operation with reference to a memory protocol (that is, a parallel transmission protocol). A process of performing serial-to-parallel conversion on the read operation may be considered as a specific implementation of parsing the read operation.

S702: The serial bus interface sends, to a DDR datapath control module, the to-be-read logical address obtained after the read operation is parsed.

S703: The DDR datapath control module queries an ARM processor in a CPU system whether data (that is, to-be-read data) stored in storage space indicated by the to-be-read logical address is located in a DRAM.

If the ARM processor in the CPU system determines that the to-be-read data is located in the DRAM, that is, the DRAM has a read hit (Hit), S704 is performed.

If determining that the to-be-read data is not located in the DRAM, that is, the DRAM does not have a read hit, the ARM processor in the CPU system performs a process of swapping the to-be-read data from a second memory to a first memory. For a specific implementation of the process, refer to the embodiment shown in FIG. 14B. Then, S704 is performed.

Whether the DRAM has the read hit and a physical address of the to-be-read data in the DRAM may be obtained by the ARM processor in the CPU system by querying an HMMU.

S704: The ARM processor in the CPU system returns information such as the physical address of the to-be-read data in the DRAM to the DDR datapath control module. The physical address of the to-be-read data in the DRAM is obtained by converting the to-be-read logical address.

S705: The DDR datapath control module delivers memory read instructions to a read queue of a DRAM controller. The memory read instructions include information such as the physical address of the to-be-read data in the DRAM.

S706: A transaction module in the DRAM controller reads the to-be-read data based on the memory read instructions received by the read queue. The DRAM controller may send the read data to a decompression module. After the decompression module decompresses the data, the decompression module returns decompressed data to the processor through the serial bus interface. A dashed line with an arrow in FIG. 13B shows a data flow direction of the to-be-read data.

Process of Swapping Data from a Second Memory to a First Memory

Figure 14A:
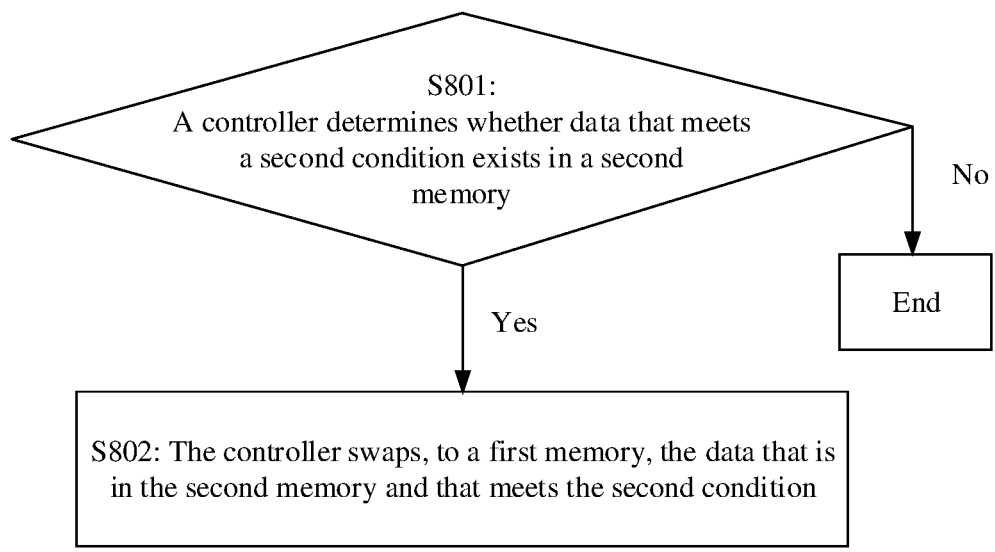
FIG. 14A is a schematic flowchart of a method for swapping data from a first memory to a second memory according to an embodiment of this application.

FIG. 14A is a schematic flowchart of a method for swapping data from a second memory to a first memory according to an embodiment of this application. The method shown in FIG. 14A may be applied to the computer system shown in FIG. 3. The method shown in FIG. 14A may include the following steps.

S801: A controller determines whether data that meets a second condition exists in a second memory. That the data that meets the second condition exists in the second memory may be considered as that data that meets a criterion for swapping to a first memory exists in the second memory.

If the data that meets the second condition exists in the second memory, S802 is performed. If the data that meets the second condition does not exist in the second memory, the process ends. Subsequently, the controller may return to perform S801 when a trigger condition of S801 is met next time.

Optionally, the data that meets the second condition includes at least one of the following: predicted to-be-read data based on read data; data whose probability of having a read hit is greater than or equal to a fourth threshold; or to-be-read data when it is determined, based on a read operation sent by a processor, that the first memory does not have a read hit.

It should be noted that, during specific implementation, data sequentially read by the processor according to a time sequence has specific correlation. Therefore, the controller may predict to-be-read data based on historical read data. For a prediction method, refer to an existing technology. Details are not described herein. A probability that the predicted to-be-read data is subsequently read by the processor is high. Therefore, the controller may swap the predicted to-be-read data from the second memory to the first memory, to improve subsequent data read efficiency.

The fourth threshold may be considered as a time threshold or a data temperature threshold. In other words, the data whose probability of having the read hit is greater than or equal to the fourth threshold may be considered as hot data. A probability that the hot data is subsequently read by the processor is high. Therefore, the controller may swap the predicted to-be-read data from the second memory to the first memory, to improve subsequent data read efficiency.

The to-be-read data when it is determined, based on the read operation sent by the processor, that the first memory does not have the read hit may be specifically the to-be-read data in FIG. 13A. In other words, a trigger condition for the controller to swap the data from the second memory to the first memory may be that in a process in which the controller performs a read operation, the first memory does not have the read hit.

S802: The controller swaps, to the first memory, the data that is in the second memory and that meets the second condition. Specifically, the controller reads the data that is in the second memory and that meets the second condition, and stores the read data into the first memory.

After S802 is performed, the current data swap process ends.

In this embodiment, when the data that meets the second condition exists in the second memory, the controller swaps the data that meets the second condition from the second memory to the first memory. In this way, when the second condition is properly set, subsequent data read efficiency is improved.

Figure 14B:
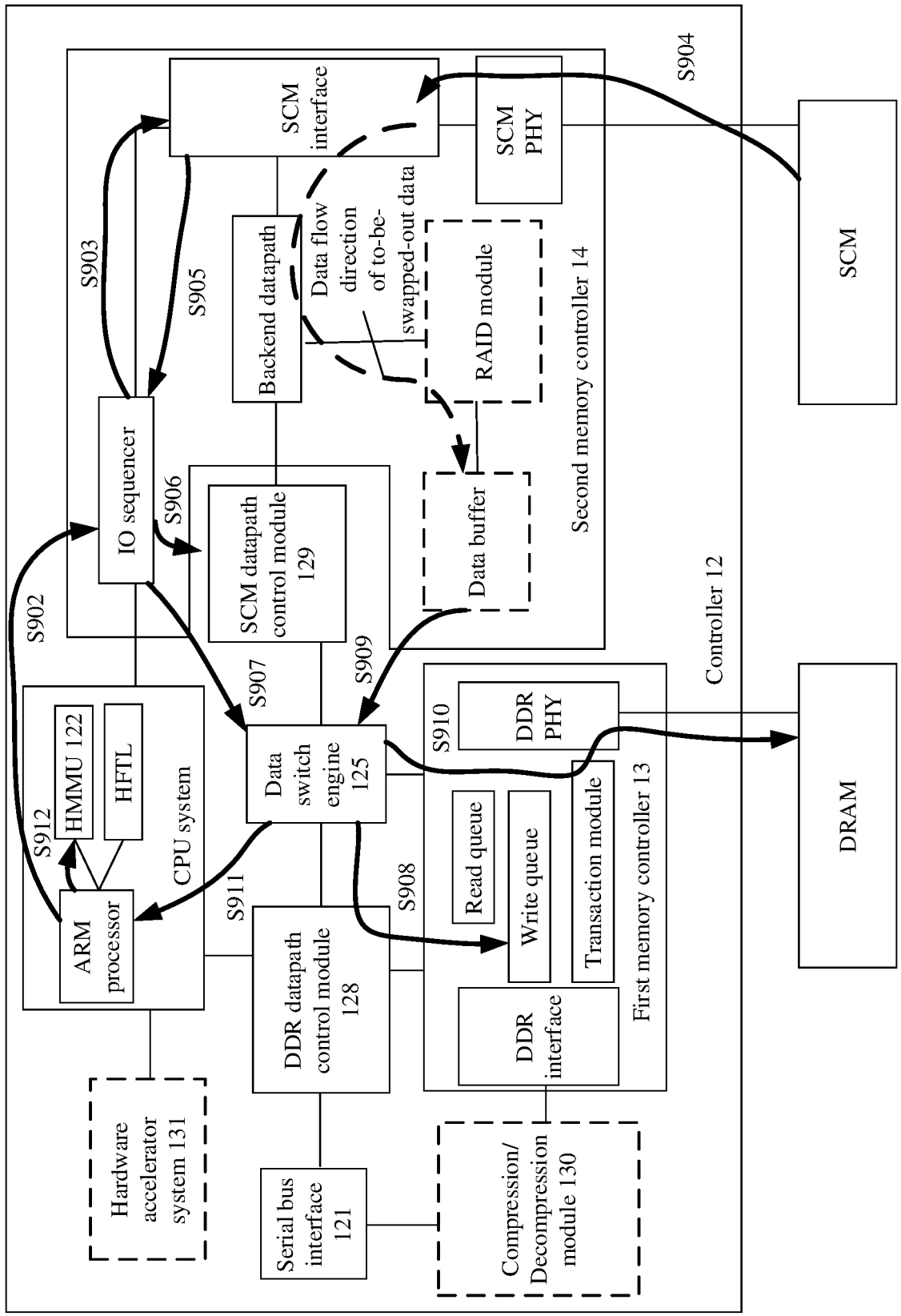
FIG. 14B is a schematic diagram of a process in which a controller performs a method for swapping data from a second memory to a first memory based on FIG. 14A according to an embodiment of this application.

FIG. 14B is a schematic diagram of a process in which a controller performs a method for swapping data from a second memory to a first memory based on FIG. 14A according to an embodiment of this application. The method shown in FIG. 14B may be applied to the controller shown in FIG. 6. The method shown in FIG. 14B may include the following steps.

S901: An ARM processor in a CPU system determines whether data that meets a second condition exists in a second memory.

If the data that meets the second condition exists in the second memory, S902 is performed. If the data that meets the second condition does not exist in the second memory, the process ends. Subsequently, the controller may return to perform S901 when a trigger condition of S901 is met next time.

S902: The ARM processor in the CPU system determines a physical address, in the second memory, of the data that meets the second condition, uses the physical address as a third physical address, and delivers a read command to an IO sequencer. The read command includes the third physical address.

S903: The IO sequencer delivers data read instructions to an SCM interface, and configures corresponding physical information.

S904: The SCM interface delivers a read command sequence to an SCM, and waits for the SCM to prepare data.

S905: After data preparation of the SCM is completed, the SCM interface returns related IO preparation completion information to the IO sequencer.

S906: The IO sequencer delivers data read instructions to an SCM datapath control module, activates an operation corresponding to the data, including but not limited to CRC/De-scramble/ECC/RAID/Decryption, and the like, and allocates a datapath resource.

Subsequently, to-be-swapped-out data is transmitted from the SCM to a backend datapath through the SCM interface. The data is corrected and decoded by the backend datapath and sent to data buffer space through an RAID module. A dashed line with an arrow in FIG. 14B shows a data flow direction of the to-be-swapped-out data. During specific implementation, the SCM datapath control module sends instructions to the backend datapath, to enable the data flow direction of the to-be-swapped-out data.

S907: After the data is written into the data buffer space, the IO sequencer notifies a data switch engine that the data that needs to be flushed to a DRAM is prepared in the data buffer space, and notifies a location of the data in the data buffer space.

S908: The data switch engine delivers a DRAM write command, and sends the DRAM write command to a write queue of a DRAM controller through the DDR datapath control module.

S909: The data switch engine reads data at a location corresponding to the data buffer space.

S910: The data switch engine writes, at a specified physical address of the DRAM through the DRAM controller, the data returned from the data buffer space. The specified physical address of the DRAM and the third physical address correspond to a same physical address.

S911: The data switch engine sends read command completion to the ARM processor in the CPU system.

S912: The ARM processor in the CPU system updates corresponding entry information of an HMMU. Specifically, after S912 is performed, that "data corresponding to the third physical address (or a logical address corresponding to the third physical address or a physical address corresponding to the third physical address in the DRAM) has been written into the DRAM" is marked in HMMU information maintained by the HMMU.

The foregoing mainly describes the solutions provided in embodiments of this application from a perspective of the methods. To implement the foregoing functions, corresponding hardware structures and/or software modules for performing the functions are included. A person skilled in the art should easily be aware that, in combination with units and algorithm steps of the examples described in embodiments disclosed in this specification, this application may be implemented by hardware or a combination of hardware and computer software. Whether a function is performed by hardware or hardware driven by computer software depends on particular applications and design constraint conditions of the technical solutions. A person skilled in the art may use different methods to implement the described functions for each particular application, but it should not be considered that the implementation goes beyond the scope of this application.

In embodiments of this application, the controller may be divided into functional modules based on the foregoing method examples. For example, each functional module may be obtained through division for a corresponding function, or two or more functions may be integrated into one processing module. The integrated module may be implemented in a form of hardware, or may be implemented in a form of a software functional module. It should be noted that, in embodiments of this application, division into the modules is an example, and is merely a logical function division. In actual implementation, another division manner may be used.

Figure 15:
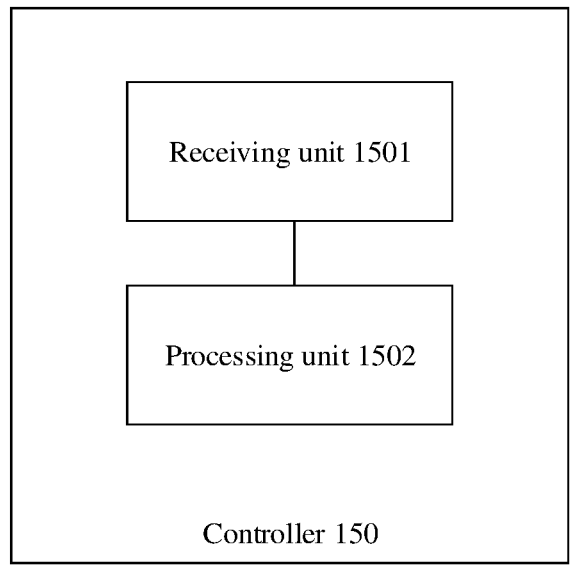
FIG. 15 is a schematic diagram of a structure of another controller according to an embodiment of this application.

FIG. 15 is a schematic diagram of a structure of a controller according to an embodiment of this application. The controller 150 shown in FIG. 15 separately communicates with a processor, a first memory, and a second memory, where read/write performance of the first memory is higher than read/write performance of the second memory. The controller 150 includes a receiving unit 1501 and a processing unit 1502. The receiving unit 1501 is configured to receive an operation request sent by the processor, where the operation request includes a logical address. The processing unit 1502 is configured to access the first memory or the second memory based on the logical address.

Specifically, the operation request is a write operation, and the processing unit 1502 is specifically configured to write, based on the logical address, to-be-written data into storage space indicated by a first physical address of the first memory, where the first physical address is a physical address that is of the first memory and that is corresponding to the logical address of the write operation. For example, with reference to FIG. 10A, the receiving unit 1501 may be configured to perform a receiving step corresponding to Sim, and the processing unit 1502 may be configured to perform S102.

Optionally, the processing unit 1502 is further configured to flush data that is in the first memory and that meets a first condition to the second memory, where the data that meets the first condition includes at least one of the following: data in the first memory when a data amount is greater than or equal to a first threshold; data whose storage time is greater than or equal to a second threshold; or data whose probability of having a read hit is less than or equal to a third threshold. For example, with reference to FIG. 11A, the processing unit 1502 may be configured to perform S301 and S302. For the data when the data amount in the first memory is greater than or equal to the first threshold, that is, when the data amount in the first memory is greater than or equal to the first threshold, all data in the first memory is flushed.

Optionally, the processing unit 1502 is further configured to write data that is in the second memory and that meets a second condition into the first memory, where the data that meets the second condition includes at least one of the following: predicted to-be-read data based on read data; data whose probability of having a read hit is greater than or equal to a fourth threshold; or to-be-read data when it is determined, based on a read operation sent by the processor, that the first memory does not have a read hit. For example, with reference to FIG. 14A, the processing unit 1502 may be configured to perform S801 and S802.

Specifically, the operation request is a read operation, and the processing unit 1502 is specifically configured to: when the first memory stores to-be-read data, read the to-be-read data from the first memory based on the logical address; or when the first memory does not store to-be-read data, read the to-be-read data from the second memory based on the logical address. For example, with reference to FIG. 13A, the receiving unit 1501 is further configured to perform a receiving step corresponding to S601, and the processing unit 1502 is further configured to perform S603 to S606.

Optionally, persistence performance of the first memory is lower than persistence performance of the second memory. For example, the first memory is a DRAM, and the second memory is an SCM. Alternatively, the first memory is a DRAM, and the second memory is a NAND.

Optionally, the controller 150 communicates with the processor through a serial bus. For example, the serial bus includes a PCIe bus.

Optionally, the controller 150 is applied to a memory device, and the memory device further includes the first memory and the second memory.

Optionally, the memory device is specifically a memory module. Alternatively, the memory device includes a main board and a memory module, the controller 150 is fixed on the main board, and the memory module includes the first memory and the second memory.

For specific descriptions of the optional manners, refer to the method embodiments. Details are not described herein again. In addition, for explanations and descriptions of beneficial effects of any controller 150 provided above, refer to the foregoing corresponding method embodiment. Details are not described again.

For example, with reference to FIG. 5, a function implemented by the receiving unit 1501 may be implemented by using the serial bus interface 121 in FIG. 5, and a function implemented by the processing unit 1502 may be implemented by using a device/module other than the serial bus interface 121 in the controller 12 in FIG. 5.

Figure 16:
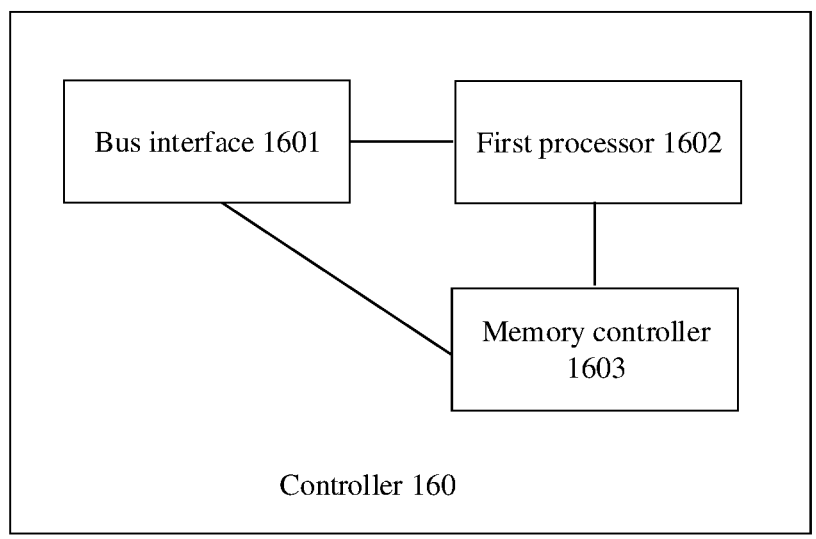
FIG. 16 is a schematic diagram of a structure of another controller according to an embodiment of this application.

FIG. 16 is a schematic diagram of a structure of another controller according to an embodiment of this application. The controller 160 shown in FIG. 16 separately communicates with a processor, a first memory, and a second memory, where read/write performance of the first memory is higher than read/write performance of the second memory. The controller 160 includes a bus interface 1601, a first processor 1602, and a memory controller 1603. The bus interface 1601 is configured to receive an operation request sent by the processor, where the operation request includes a logical address. The first processor 1602 is configured to send a first instruction to the memory controller based on the logical address. The memory controller 1603 is configured to access the first memory or the second memory based on the first instruction. For example, with reference to FIG. 10B, the bus interface 1601 may be configured to perform S201, the first processor 1602 may be configured to perform S203, and the memory controller 1603 may be configured to perform S205.

Optionally, the operation request is a write operation, and the memory controller 1603 is specifically configured to write to-be-written data into storage space indicated by a first physical address of the first memory, where the first physical address is a physical address that is of the first memory and that is corresponding to the logical address.

Optionally, the first processor 1602 is further configured to send a second instruction to the memory controller 1603; and the memory controller 1603 is further configured to flush, to the second memory based on the second instruction, data that is in the first memory and that meets a first condition, where the data that meets the first condition includes at least one of the following: data in the first memory when a data amount is greater than or equal to a first threshold; data whose storage time is greater than or equal to a second threshold; data whose probability of having a read hit is less than or equal to a third threshold; or to-be-read data when it is determined, based on a read operation sent by the processor, that the first memory does not have a read hit. For example, with reference to FIG. 11B, the first processor 1602 may be configured to perform S402.

Optionally, the first processor 1602 is further configured to send a third instruction to the memory controller 1603; and the memory controller 1603 is further configured to write, based on the third instruction, data that is in the second memory and that meets a second condition into the first memory, where the data that meets the second condition includes at least one of the following: predicted to-be-read data based on read data; or data whose probability of having a read hit is greater than or equal to a fourth threshold.

Optionally, the operation request is a read operation, and the memory controller 1603 is specifically configured to: when the first memory stores to-be-read data, read the to-be-read data from the first memory based on the logical address; or when the first memory does not store to-be-read data, read the to-be-read data from the second memory based on the logical address.

Optionally, persistence performance of the first memory is lower than persistence performance of the second memory. For example, the first memory is a DRAM, and the second memory is an SCM. Alternatively, the first memory is a DRAM, and the second memory is a NAND.

Optionally, the controller 160 communicates with the processor through a serial bus.

For example, the serial bus includes a PCIe bus.

Optionally, the controller 160 is applied to a memory device, and the memory device further includes the first memory and the second memory.

Optionally, the controller 160 is fixed on a memory module. For example, the memory device is specifically the memory module.

Optionally, the controller 160 is fixed on a main board. For example, the memory device includes the main board and a memory module, and the memory module includes the first memory and the second memory.

Optionally, the memory controller 1603 may include a first memory controller and a second memory controller. The first memory controller is configured to control access to the first memory, and the second memory controller is configured to control access to the second memory.

For specific descriptions of the optional manners, refer to the method embodiments. Details are not described herein again. In addition, for explanations and descriptions of beneficial effects of any controller 160 provided above, refer to the foregoing corresponding method embodiment. Details are not described again.

An embodiment of this application further provides a chip system. The chip system includes at least one controller. Certainly, the chip system may further include another discrete device. This is not specifically limited in this embodiment of this application.

Another embodiment of this application further provides a computer-readable storage medium. The computer-readable storage medium stores instructions. When the instructions are run on a controller, the controller performs steps performed by the controller in the method process shown in the foregoing method embodiments.

In some embodiments, the disclosed method may be implemented as computer program instructions encoded in a machine-readable format on a computer-readable storage medium or encoded on another non-transitory medium or product.

In some embodiments, a computer program product is further provided, and the computer program product includes a computer program for executing a computer process on a computing device.

In an embodiment, the computer program product is provided by using a signal bearer medium. The signal bearer medium may include one or more program instructions. When the one or more program instructions are run on one or more processors, some or all functions performed by the controller in the foregoing descriptions may be provided. Details are not described herein again.

In some examples, the signal bearer medium may include a computer-readable medium, for example, but not limited to, a hard disk drive, a compact disc (CD), a digital video disc (DVD), a digital tape, a memory, a read-only memory (ROM), or a random access memory (RAM).

In some implementations, the signal bearer medium may include a computer-recordable medium for example, but not limited to, a memory, a read/write (R/W) CD, or an R/W DVD.

In some implementations, the signal bearer medium may include a communications medium, for example, but is not limited to a digital and/or analog communications medium (for example, an optical fiber cable, a waveguide, a wired communication link, or a wireless communication link).

The signal bearer medium may be conveyed by a wireless-form communications medium (for example, a wireless communications medium that complies with the IEEE 802.11 standard or another transmission protocol). The one or more program instructions may be, for example, computer-executable instructions or logic implementation instructions.

It should be understood that the arrangement described herein is merely used as an example. Thus, a person skilled in the art appreciates that another arrangement and another element (for example, a machine, an interface, a function, a sequence, and a group of functions) can be used to replace the arrangement, and some elements may be omitted together depending on a desired result. In addition, many of the described elements are functional entities that can be implemented as discrete or distributed components, or implemented in any appropriate combination at any appropriate location in combination with another component.

All or some of the foregoing embodiments may be implemented by using software, hardware, firmware, or any combination thereof. When a software program is used to implement embodiments, all or some of embodiments may be implemented in a form of a computer program product. The computer program product includes one or more computer instructions. When the computer-executable instructions are loaded and executed on a computer, the procedures or functions according to embodiments of this application are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

What is claimed is:

1. A data processing method for a memory device, wherein the memory device comprises a controller, a first memory, and a second memory, wherein the controller separately communicates with a processor, the first memory, and the second memory, wherein read/write performance of the first memory is higher than read/write performance of the second memory, and wherein the method comprises:
   receiving an operation request of the processor, wherein the operation request comprises a logical address; and
   accessing a first one of the first memory or the second memory based on the logical address, wherein accessing the first one of the first memory or the second memory comprises:
   performing, in response to the operation request being a read request:
      writing, in response to the controller determining that the first memory does not have a read hit, data that is in the second memory into the first memory at a physical address in the first memory associated with the logical address; and
      reading to-be-read data from the first memory according to the logical address; and
   performing, in response to the operation request being a write request:
      writing to-be-written data to the first memory according to the logical address; and
      marking, in response to second data corresponding to the logical address existing in the second memory, the second data as invalid data.

2. The method according to claim 1, wherein the operation request is a request for a write operation, and wherein the accessing the first memory or the second memory based on the logical address comprises:
   writing, based on the logical address, to-be-written data into storage space indicated by a first physical address of the first memory, wherein the first physical address is a physical address that is of the first memory and that is corresponding to the logical address.

3. The method according to claim 1, wherein the method further comprises:
   flushing data that is in the first memory and that meets a first condition to the second memory;
   wherein the data that meets the first condition comprises at least one of the following:
      data in the first memory when a data amount is greater than or equal to a first threshold;
      data whose storage time is greater than or equal to a second threshold; and data whose probability of having a read hit is less than or equal to a third threshold.

4. The method according to claim 1, wherein the method further comprises:
writing data that is in the second memory and that meets a second condition into the first memory, wherein the data that meets the second condition comprises at least one of the following:
predicted to-be-read data based on read data; or
data whose probability of having a read hit is greater than or equal to a fourth threshold.

5. The method according to claim 1, wherein the operation request is a read operation, and wherein the accessing the first memory or the second memory based on the logical address comprises:
reading, when the first memory stores to-be-read data, the to-be-read data from the first memory based on the logical address; or
reading, when the first memory does not store to-be-read data, the to-be-read data from the second memory based on the logical address.

6. The method according to claim 1, wherein persistence performance of the first memory is lower than persistence performance of the second memory.

7. The method according to claim 6, wherein the first memory is a dynamic random access memory (DRAM) and the second memory is a storage class memory (SCM), or wherein the first memory is a DRAM and the second memory is a NAND flash.

8. The method according to claim 1, wherein the controller communicates with the processor through a serial bus.

9. The method according to claim 8, wherein the serial bus comprises a peripheral component interconnect express PCIe bus.

10. The method according to claim 1, wherein the memory device comprises a main board and a memory module, wherein the controller is fixed on the main board, and wherein the memory module comprises the first memory and the second memory.

11. A controller, wherein the controller separately communicates with a processor, a first memory, and a second memory, wherein read/write performance of the first memory is higher than read/write performance of the second memory, and wherein the controller comprises a bus interface, a first processor, and a memory controller;
wherein the bus interface is configured to receive an operation request sent by the processor, wherein the operation request comprises a logical address;
wherein the first processor is configured to send a first instruction to the memory controller based on the logical address; and
wherein the memory controller is configured to access a first one of the first memory or the second memory based on the first instruction, wherein the memory controller being configured to access the first one of the first memory or the second memory comprises:
the memory controller being configured to perform, in response to the operation request being a read request:
writing, in response to the memory controller determining that the first memory does not have a read hit, data that is in the second memory into the first memory at a physical address in the first memory associated with the logical address; and
reading to-be-read data from the first memory according to the logical address; and
the memory controller being configured to perform, in response to the operation request being a write request:
writing to-be-written data to the first memory according to the logical address; and
marking, in response to second data corresponding to the logical address existing in the second memory, the second data as invalid data.

12. The controller according to claim 11, wherein the operation request is a write operation, and the memory controller is specifically configured to write to-be-written data into storage space indicated by a first physical address of the first memory, wherein the first physical address is a physical address that is of the first memory and that is corresponding to the logical address.

13. The controller according to claim 11, wherein the first processor is further configured to send a second instruction to the memory controller; and
wherein the memory controller is further configured to flush, to the second memory based on the second instruction, data that is in the first memory and that meets a first condition, wherein the data that meets the first condition comprises at least one of the following:
data in the first memory when a data amount is greater than or equal to a first threshold;
data whose storage time is greater than or equal to a second threshold; and
data whose probability of having a read hit is less than or equal to a third threshold.

14. The controller according to claim 11, wherein the first processor is further configured to send a third instruction to the memory controller; and
wherein the memory controller is further configured to write, based on the third instruction, data that is in the second memory and that meets a second condition into the first memory, wherein the data that meets the second condition comprises at least:
predicted to-be-read data based on read data; or
data whose probability of having a read hit is greater than or equal to a fourth threshold.

15. The controller according to claim 11, wherein the operation request is a read operation, and the memory controller is configured to:
read, when the first memory stores to-be-read data, the to-be-read data from the first memory based on the logical address; or
read, when the first memory does not store to-be-read data, the to-be-read data from the second memory based on the logical address.

16. The controller according to claim 11, wherein persistence performance of the first memory is lower than persistence performance of the second memory.

17. The controller according to claim 16, wherein the first memory is a dynamic random access memory (DRAM) and the second memory is a storage class memory (SCM), or the first memory is a DRAM and the second memory is a NAND flash.

18. The controller according to claim 11, wherein the controller is applied to a memory device, wherein the memory device further comprises the first memory and the second memory, and the memory device is a memory module.

19. The controller according to claim 11, wherein the controller is applied to a memory device, wherein the memory device further comprises the first memory and the second memory, wherein the memory device comprises a main board and a memory module, wherein the controller is fixed on the main board, and wherein the memory module comprises the first memory and the second memory.

20. A computer system, comprising:
a first processor;
a first memory;
a second memory, wherein read/write performance of the first memory is higher than read/write performance of the second memory; and
a controller, wherein the controller separately communicates with the first processor, the first memory, and the second memory, and wherein the controller comprises a bus interface, a second processor, and a memory controller;
wherein the bus interface is configured to receive an operation request sent by the first processor, wherein the operation request comprises a logical address;
wherein the second processor is configured to send a first instruction to the memory controller based on the logical address; and
wherein the memory controller is configured to access a first one of the first memory or the second memory based on the first instruction, wherein the memory controller being configured to access the first one of the first memory or the second memory comprises:
the memory controller being configured to perform, in response to the operation request being a read request:
writing, in response to the memory controller determining that the first memory does not have a read hit, data that is in the second memory into the first memory at a physical address in the first memory associated with the logical address; and
reading to-be-read data from the first memory according to the logical address; and
the memory controller being configured to perform, in response to the operation request being a write request:
writing to-be-written data to the first memory according to the logical address; and
marking, in response to second data corresponding to the logical address existing in the second memory, the second data as invalid data.

* * * * *